United States Patent [19]

Suzuki

[11] Patent Number: 4,868,729

[45] Date of Patent: Sep. 19, 1989

[54] POWER SUPPLY UNIT

[75] Inventor: Koji Suzuki, Yokohama, Japan

[73] Assignee: Canon Kabushiki Kaisha, Tokyo, Japan

[21] Appl. No.: 188,749

[22] Filed: Apr. 29, 1988

Related U.S. Application Data

[63] Continuation of Ser. No. 904,810, Sep. 8, 1986, abandoned, which is a continuation of Ser. No. 466,517, Feb. 15, 1983, abandoned.

[30] Foreign Application Priority Data

| Feb. 16, 1982 | [JP] | Japan | 57-23168 |
| Mar. 16, 1982 | [JP] | Japan | 57-40308 |
| Jul. 7, 1982 | [JP] | Japan | 57-119067 |
| Jul. 7, 1982 | [JP] | Japan | 57-129617 |
| Jul. 15, 1982 | [JP] | Japan | 57-122019 |
| Jul. 27, 1982 | [JP] | Japan | 57-129616 |
| Jul. 27, 1982 | [JP] | Japan | 57-129615 |
| Jul. 27, 1982 | [JP] | Japan | 57-129618 |

[51] Int. Cl.$^4$ .................................... H02M 3/335
[52] U.S. Cl. ........................... 363/21; 363/97; 355/219
[58] Field of Search .......... 355/3 CH, 14 CH; 363/18, 19, 20, 21, 41, 86, 89, 97, 124; 323/275, 285, 902

[56] References Cited

U.S. PATENT DOCUMENTS

| 3,742,330 | 6/1973 | Hodges et al. | 363/41 |
| 4,079,295 | 3/1978 | den Hollander | 363/20 |
| 4,092,709 | 3/1978 | Voigt et al. | 363/18 |
| 4,133,025 | 1/1979 | Wurzberg | 363/97 |
| 4,253,136 | 2/1981 | Nanko | 363/21 |
| 4,293,904 | 10/1981 | Brooks et al. | 363/86 |
| 4,302,803 | 11/1981 | Shelly | 363/20 |
| 4,318,165 | 3/1982 | Kornrumpf et al. | 363/21 |
| 4,326,245 | 4/1982 | Saleh | 323/275 |
| 4,327,404 | 4/1982 | Horiguchi | 363/19 |
| 4,791,528 | 12/1988 | Suzuki | 361/235 |

FOREIGN PATENT DOCUMENTS

| 140154 | 10/1979 | Japan | 363/17 |
| 142519 | 11/1979 | Japan | 363/21 |
| 0157759 | 12/1980 | Japan | 355/3 CH |
| 62429 | 4/1982 | Japan | 363/21 |
| 56196521 | 6/1983 | Japan | 363/19 |

OTHER PUBLICATIONS

New Electronics, vol. 14, No. 14, Flyback Converters for Multirail Switchers, by Robin Stephens, July, 1981.

Primary Examiner—Patrick R. Salce
Assistant Examiner—Judson H. Jones
Attorney, Agent, or Firm—Fitzpatrick, Cella, Harper & Scinto

[57] ABSTRACT

A power supply unit for an electrostatic printing apparatus such as a copying machine is disclosed. A transformer is driven by a drive circuit having a pulse generator and produces a high voltage in the course of decay of a pulse. An output of a secondary winding of the transformer is detected to control the drive circuit such that the output of the secondary winding is kept at a constant level.

16 Claims, 22 Drawing Sheets 4,868,729

POWER SUPPLY UNIT

This application is a continuation of application Ser. No. 904,810 filed Sept. 8, 1986, which is a continuation of Ser. No. 466,517, filed Feb. 15, 1983, both abandoned.

BACKGROUND OF THE INVENTION

2. Field of the Invention

The present invention relates to a power supply unit suitable for use in an electrostatic printing apparatus.

2. Brief Description of the Prior Art

Prior art power supply units of this type include one which uses a ferro-resonance transformer and one which uses a self-excited or externally excited inverter. The power supply unit which uses the ferro-resonance transformer is large in size and heavy in weight and the power supply unit which uses the self-excited o externally excited inverter has a large switching loss and is extremely noisey. When such a power supply unit is used to drive a plurality of chargers of a copying machine, one transformer for each of the chargers is necessary if the chargers are to be driven with constant currents. When low voltage loads such as a developing bias circuit and a sequence control circuit are to be fed in addition to the high voltages fed to the chargers, a plurality of transformers are also necessary. As a result, the number of transformers needed increases and hence the manufacturing cost increases too much.

In the prior art, in order to form an image on a photosensitive drum, a sequence controller for controlling an entire system is operated after the power is turned on to control timing of the photosensitive drum and timing of energization of the chargers to generate various high voltages in order to control the chargers such that an optimum image formation condition is attained. Since an on-off control circuit for a motor and an on-off control circuit for the high voltages to be applied to the chargers are necessary in order to control the speed of the rotary drum and the charge quantities of the chargers, the unit is complex and hence expensive.

SUMMARY ON THE INVENTION

It is an object of the present invention to provide a small-size and light-weight power supply unit.

It is another object of the present invention to provide a high efficiency and relatively quiet power supply unit.

It is another object of the present invention to provide an inexpensive power supply unit capable of stably supplying power to various loads.

It is another object of the present invention to provide a power supply unit for an electrostatic printing apparatus which can stably supply power to a low voltage load and a high voltage load with a single transformer.

It is another object of the present invention to provide a power supply unit for an electrostatic printing apparatus which can maintain current to predetermined ones of a plurality of loads driven by a single transformer to precise constant levels.

It is another object of the present invention to provide an inexpensive and highly reliable power supply unit.

It is another object of the present invention to provide a compact, inexpensive and highly reliable power supply unit which supplies power to a plurality of high voltage loads from a single secondary winding of a single high voltage transformer and selectively detects a predetermined load current or load voltage to control power supplied to a primary winding of the transformer.

It is an object of the present invention to provide an inexpensive and high image quality electrostatic printing apparatus.

It is a further object of the present invention to provide a light-weight and compact electrostatic printing apparatus which is simple in sequence control and hence uncomplicated in its control circuit.

DETAILED DESCRIPTION OF THE PREFERRED EMBODIMENTS

Figure 1:
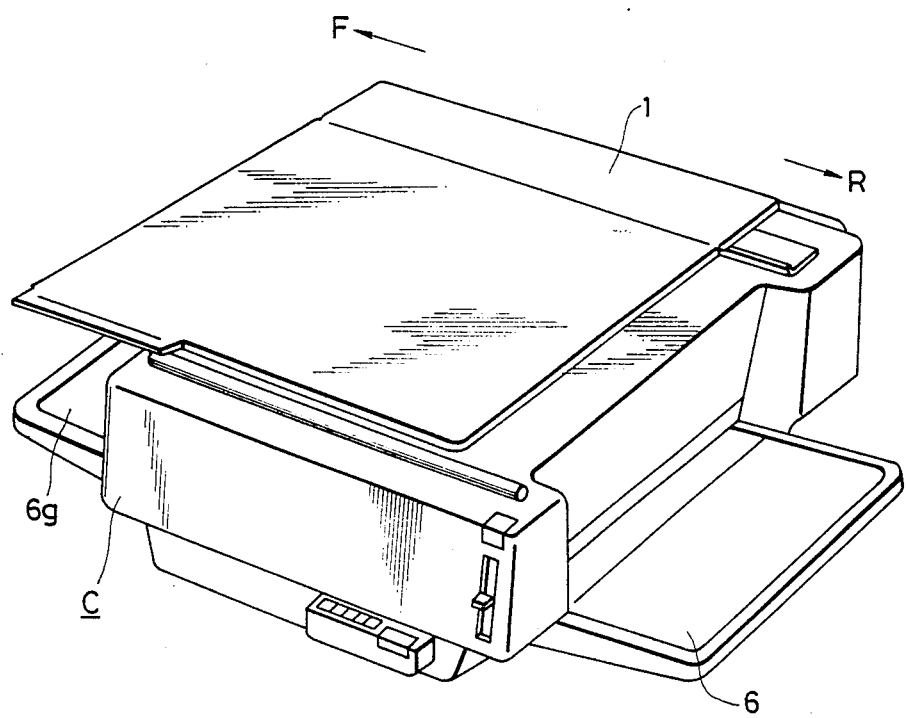
FIG. 1 shows a perspective view of a copying machine to which present invention is applied.
Figure 2:
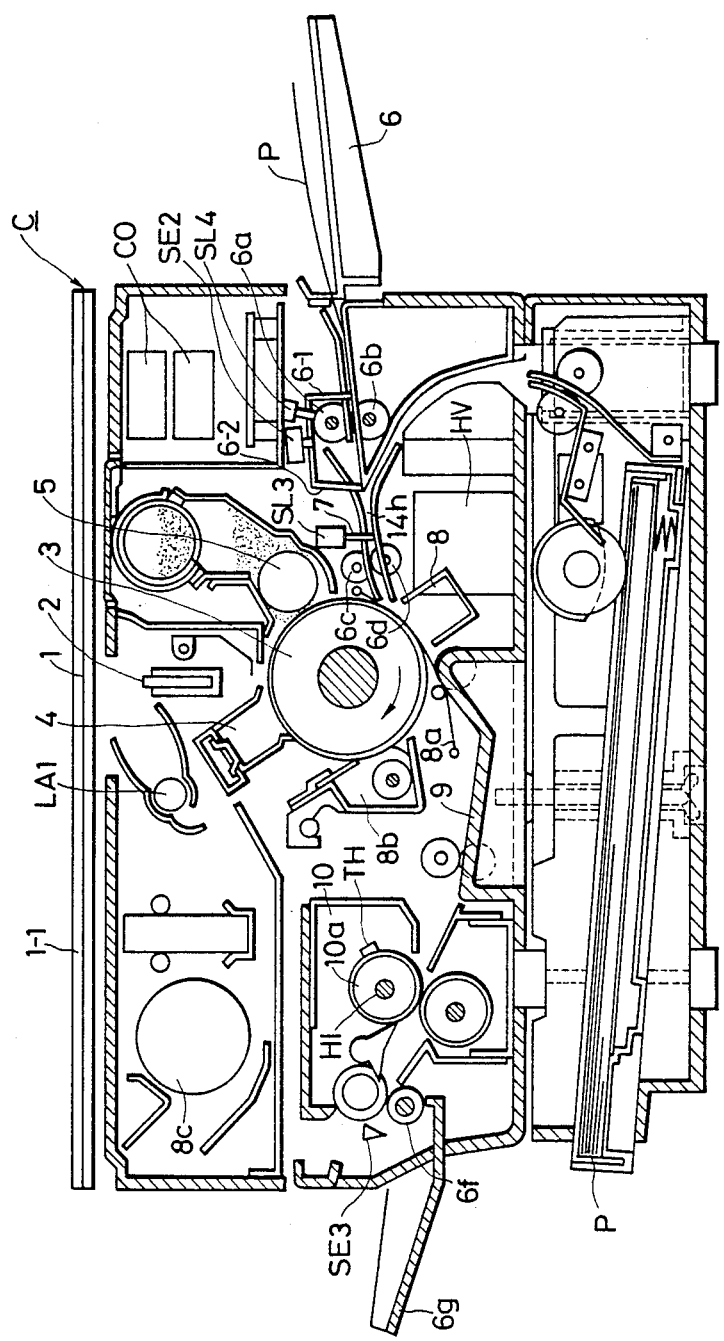
FIG. 2 shows a sectional view of the copying machine of FIG. 1.

FIG. 1 shows a perspective view of a copying machine to which the present invention is applied, and FIG. 2 shows a sectional view thereof. In those figures, C denotes a copying machine main body, and numeral 1 denotes an original mount table of transparent material, on which a pressing plate 1—1 to fix an original on the mount table 1 is mounted and the mount table 1 is moved forward in a direction of an arrow F and moved backward in a direction of an arrow R. Numeral 2 denotes a short focal distance, small diameter focusing element array. An original image reflected from the original mounted on the original mount 1 and illuminated by a halogen lamp LA1 is slit-exposed onto a photosensitive drum 3 by the array 2. Numeral 4 denotes a charger which uniformly charges the photosensitive drum 3. An image is exposed on the uniformly charged drum 3 by the array 2 so that an electrostatic image is formed in accordance with the original image. The electrostatic image is then developed by a developing unit 5. When a paper feed sensor SE2 (which is actuated by detection arms 6-1 and 6-2 extending to opposite sides of a paper feed roller 6a so that it is turned on when one of the arms 6-1 and 6-2 are lifted by a record paper P) for detecting when the record paper P is manually inserted from a manual insertion table 6, is turned on, a solenoid SL4 is energized and the continuously rotating paper feed roller 6a descends toward a stationary roller 6b to hold the paper P therebetween so that the paper P is conveyed. Since a registration shutter 7 is positioned to block a convey path 14h, a leading edge of the paper abuts against the shutter 7 and stops there. As the leading edge of the paper is stopped, the paper slips between the rollers 6a and 6b and is not further conveyed. Soon after, the solenoid SL4 is deenergized. Then, the solenoid SL4 is again energized and a registration signal is supplied to a solenoid SL3 so that the shutter 7 is lifted up and the paper is conveyed again and fed toward the photosensitive drum 3 by continuously rotating rollers 6c and 6d.

A toner image on the photosensitive drum 3 is transferred to the record paper P by a transfer charger 8. Then, the record paper P separated from the drum 3 by a separation belt 8a is guided to a fixing unit 10 by a guide 9 and the toner image on the record paper P is fixed by a fixing roller 10a having a halogen heater H1 and the paper is then ejected onto a tray 6g by an ejection roller 6f.

SE3 denotes an optical or mechanical paper ejection sensor which senses the paper to produces a detection signal. TH denotes a thermister which detects a temperature of the fixing roller 10a of the fixing unit 10.

The untransferred toner remaining on the drum 3 is cleaned off by a cleaner 8b for recovery. Numeral 8c denotes a cooling fan which ejects heated air within a housing of the copying machine.

CO denotes a controller for controlling the operation of the copying machine and HV denotes a power supply unit for supplying powers to the controller and the chargers.

The preferred embodiments of the present invention are now explained with reference to the accompanying drawings.

Figure 3:
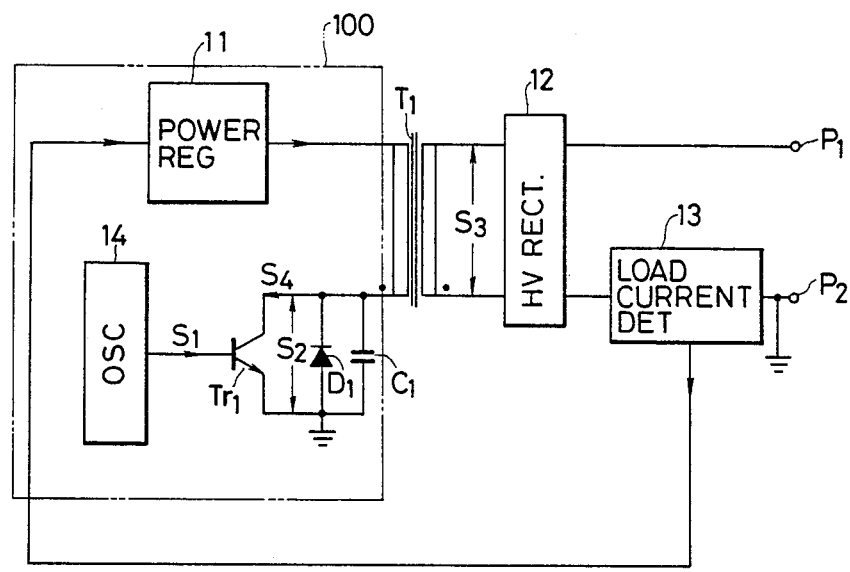
Fig. 3 shows an embodiment of a power supply unit of the present invention.

FIG. 3 shows one embodiment of the power supply unit of the present invention. T1 denotes a flyback transformer, numeral 12 denotes a high voltage rectification circuit, numeral 13 denotes a load current detection circuit, numeral 14 denotes an oscillation circuit, numeral 11 denotes a power regulation circuit, P1 and P2 denote output terminals, and 100 denotes a driving means.

In operation, a switching transistor Tr1 is separately turned on and off by an output signal of the oscillation circuit 14. The flyback transformer T1 stores energy during the turn-on period of the switching transistor Tr1 and discharges the energy during the turn-off period of the switching transistor Tr1 through a sinusoidal wave oscillation at a constant frequency determined by an inductance as seen from a primary winding, a distributed capacitance of the flyback transformer T1 as seen from the primary winding and an external capacitance (resonance capacitance) C1. A leakage inductance of the flyback transformer T1 is selected such that it resonates with the distributed capacitance at a high order frequency to enhance efficiency. The power regulation circuit 11 controls a voltage applied to the primary winding or a duty cycle of the primary winding in order to maintain a load current detected by the load current detection circuit 13 at a constant level. Since the flyback transformer T1 is used in the present embodiment, noise is reduced and a high efficiency is attained.

Figure 4:
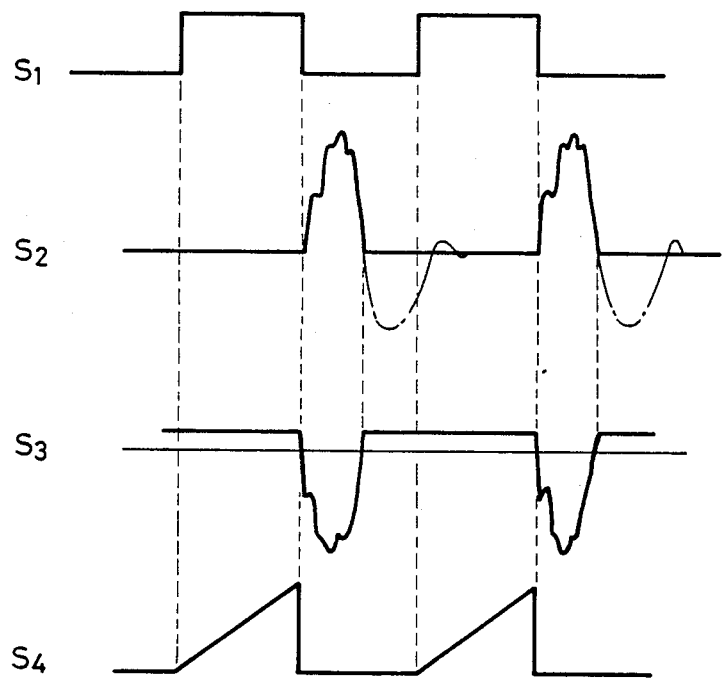
FIG. 4 shows operation waveforms of the circuit of FIG. 3.

FIG. 4 shows signal waveforms in the circuit of FIG. 3. S1 represents an output signal of the oscillation circuit 14, that is, a base drive signal of the switching transistor Tr1, S2 represents a collector voltage waveform of the switching transistor Tr1, S3 represents denotes an output waveform of a secondary winding of -the flyback transformer T1, and S4 represents a collector current waveform of the switching transistor Tr1. When a damper diode D1 is absent, the collector voltage waveform changes to that shown by a chain line added to the waveform S2. The damper diode D1 conducts during a negative cycle of the switching transistor Tr1 to protect the switching transistor Tr1 and also serves to return the energy to the power regulation circuit 11. The output waveform (signal waveform S3)

of the secondary winding of the flyback transformer T1 has equal negative cycle integration and positive cycle integration in a steady state, and a positive cycle output duration is longer than a negative cycle output duration. Accordingly, a rectified output voltage may be as large as an amplitude. In the signal waveform S2, the collector voltage rises in a sinusoidal waveform when the switching transistor Tr1 is turned off. Thus, a switching loss is small and a high efficiency is attained. Since the collector voltage is almost zero when the switching transistor Tr1 is turned on, the switching loss at this time is also very small. As to noise, since the collector voltage waveform is a sinusoidal wave as shown by the signal waveform S2 and the collector current waveform is a linearly increasing waveform as shown by the signal waveform S4, high frequency noise is very small. Since the flyback transformer T1 oscillates at the predetermined frequency, a large step-up is attained in the primary winding by selecting the on period of the switching transistor Tr1 to be long and the rectified output voltage can be increased to up to the peak value as shown by the signal waveform S3. Accordingly, a step-up ratio of the flyback transformer T1 can be reduced. In the present embodiment, the step-up ratio of the flyback transformer T1 can be reduced by a factor of approximately 10 to compare with the step-up ratio required to attain the same output by a conventional transformer.

Accordingly, a turn ratio of the flyback transformer T1 can be reduced and hence the size and the weight of the flyback transformer T1 can be reduced. Since the output waveform of the secondary winding is that shown by the signal waveform S3, a reverse breakdown voltage of a diode in the high voltage rectification circuit 12 may be low.

Figure 5:
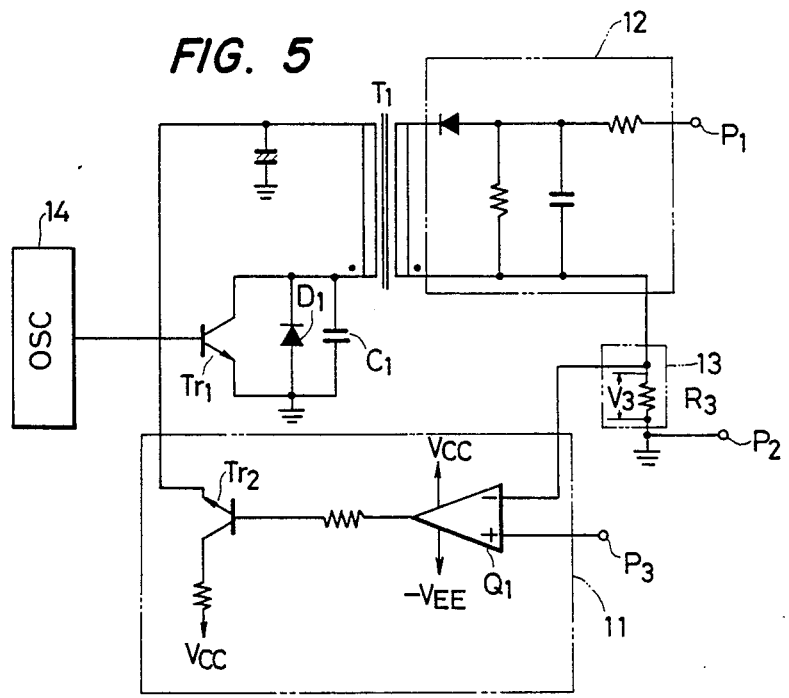
FIG. 5 shows a specific circuit diagram of the power supply unit in accordance with the embodiment of FIG. 3.

FIG. 5 shows a detailed circuit diagram of the power supply unit shown in FIG. 3. VCC and $V_{EE}$ represent input power supply voltages. Similar functional elements to those shown in FIG. 3 are designated by like numerals. In FIG. 5, a voltage V3 is developed across a sampling resistor R3 in the current detection circuit 13 by the load current. An error amplifier Q1 in the power regulation circuit 11 compares the voltage V3 with a reference voltage applied to a terminal P3 to control the voltage applied to the primary winding of the flyback transformer T1. As a result, the output waveform of the secondary winding is stabilized and a constant current characteristic is maintained. Since the circuit of FIG. 5 is highly efficient as described above, the loss of the power regulation circuit 11 for the constant current control is relatively small.

In FIG. 5, the power regulation circuit 11 is of a series regulator configuration. Alternatively, it may be a self-excited switching regulator configuration as shown in FIG. 6 which controls a duty cycle.

Figure 6:
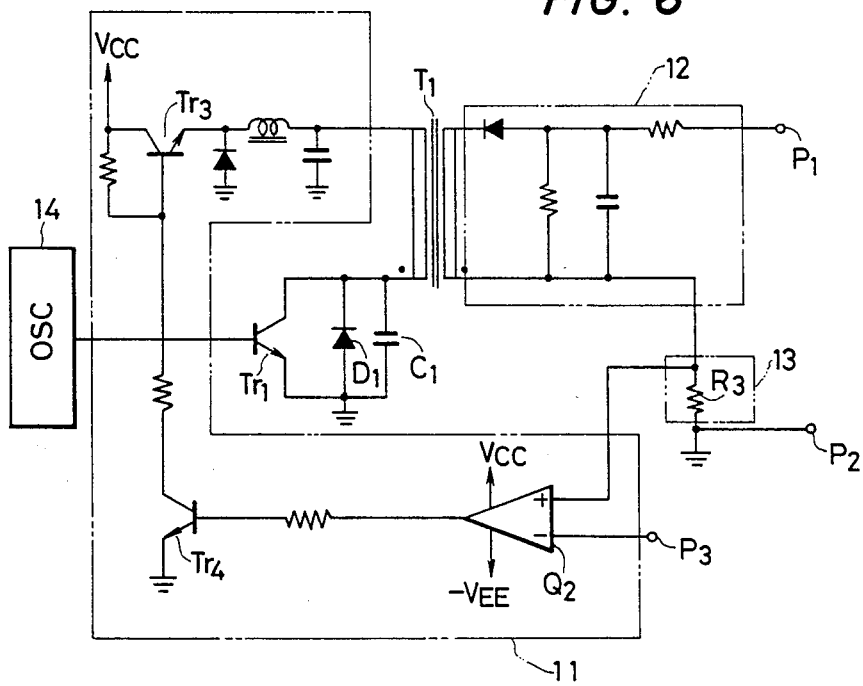
FIG. 6 shows a circuit diagram of a power supply unit which uses a switching regulator.

In FIG. 6, an error amplifier Q2 functions as a comparator and transistors Tr3 and Tr4 function as the switching transistors. In the embodiment of FIG. 6, since the power regulation circuit 11 has the switching regulator instead of the series regulator, the power loss of the power regulation circuit 11 can be further reduced.

Figure 7:
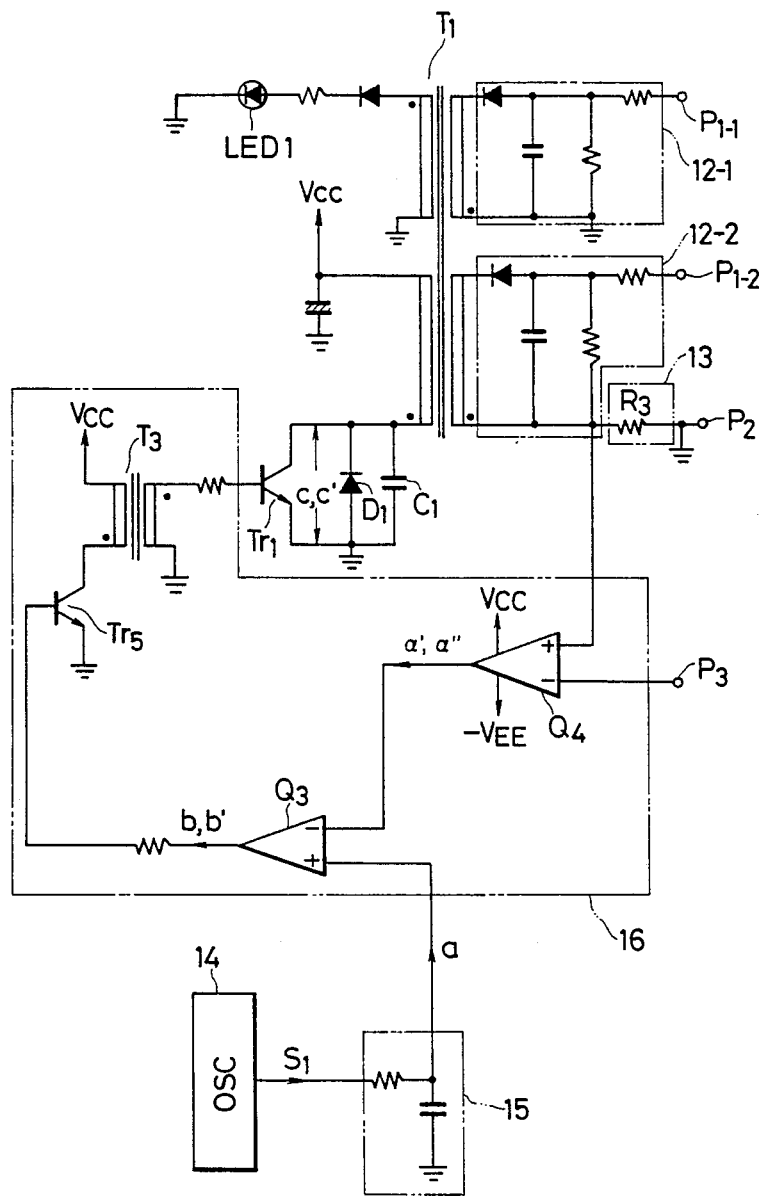
FIG. 7 shows a circuit diagram of a power supply unit which supplies power to a plurality of loads from a plurality of secondary windings.
Figure 8:
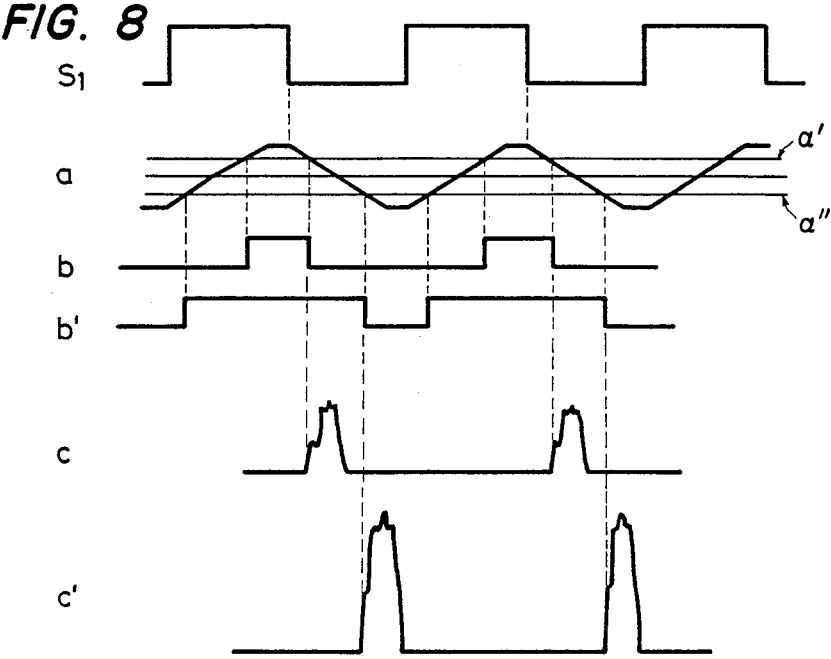
FIG. 8 shows operation waveforms in the circuit of FIG. 7.

FIG. 7 shows another embodiment of the present invention. The circuit of FIG. 7 detects the load current to control the energization timing of the switching transistor Tr1 by a power regulation circuit 16. $P_{1-1}$, $P_{1-2}$ and P2 denote output terminals and 12-1 and 12-2 denote high voltage rectification circuits. Operation waveforms of the circuit of FIG. 7 are shown in FIG. 8. The load current detected by the sampling resistor R3 is compared with a reference voltage applied to a terminal P3, by an error amplifier Q4. If the load current is larger than the reference voltage applied to the terminal P3, the output of the error amplifier Q4 reaches a level $\alpha'$ in a waveform a. The output $\alpha'$ is applied to a (−) input terminal of an error amplifier Q3 which operates as an comparator. A signal a which is an integration of an output S1 of the oscillation circuit 14 by an integration circuit 15 is applied to a (+) input terminal of the error amplifier Q3 and it is compared with the output $\alpha'$ of the error amplifier Q4 to produce an output b. T3 denotes a base drive transformer for the switching transistor Tr1. If a transistor Tr5 is turned on at a time when the output b is at high level, the base voltage of the switching transistor Tr1 is rendered positive. The high level period of the output b defines the conduction period of the switching transistor Tr1 or the energy storage period for the flyback transformer T1. As a result, the collector output of the switching transistor Tr1 is small as shown by a waveform c and the output voltage of the flyback transformer T1 is also small so that the load current is reduced. On the other hand, if the load current is smaller than the reference voltage applied to the terminal P3, the output of the error amplifier Q1 reaches a level $\alpha$ in the waveform a. The output $\alpha$ is similarly applied to the (−) input terminal of the error amplifier Q3. The signal a is applied to the (+) input terminal of the error amplifier Q3, which compares the output $\alpha$ with the signal a to produce an output b'. Since a high level period of the output b' defines the conduction period of the switching transistor Tr1, the energy storage period of the flyback transformer T1 increases. Accordingly, the collector output of the switching transistor is large as shown in a waveform c' and the load current increases.

Numeral 12-1 denotes a power supply circuit to a high voltage load (for example the charger 4 and the transfer charger 8) different from the power supply circuit 12-2, and LED1 denotes a high voltage generation indicating LED. In the embodiment of FIG. 7, since the conduction period is controlled instead of the series regulator control, the power loss of the power regulation circuit 16 can be significantly reduced. Accordingly, the entire power supply unit is further compacted and reduced in weight and an allowable variation range of the input power supply voltage Vcc can be widened, and temperature rise of associated equipments can be suppressed.

In the embodiments of FIGS. 3, 5 and 6, the number of output winding is one, but a plurality of output windings may be used as shown in FIG. 7. In FIGS. 3, 5 and 6, the conduction timing of the switching transistor Tr1 may be controlled as shown in FIG. 7. Alternatively, the drive frequency of the switching transistor may be varied by a controlled variable frequency oscillator to be described later.

As described hereinabove, according to the present invention, the constant current characteristic is maintained and the stable output waveform is obtained. The power supply unit which has a high efficiency and low noise is attained and the power supply unit is compact in size and light in weight because of a low step-up ratio. Accordingly, when the present invention is applied to an electronic printing apparatus such as a copying machine, a compact and light copying machine of a high image quality is attained because the outputs of the chargers are stabilized by the stable high voltage output.

Figure 9:
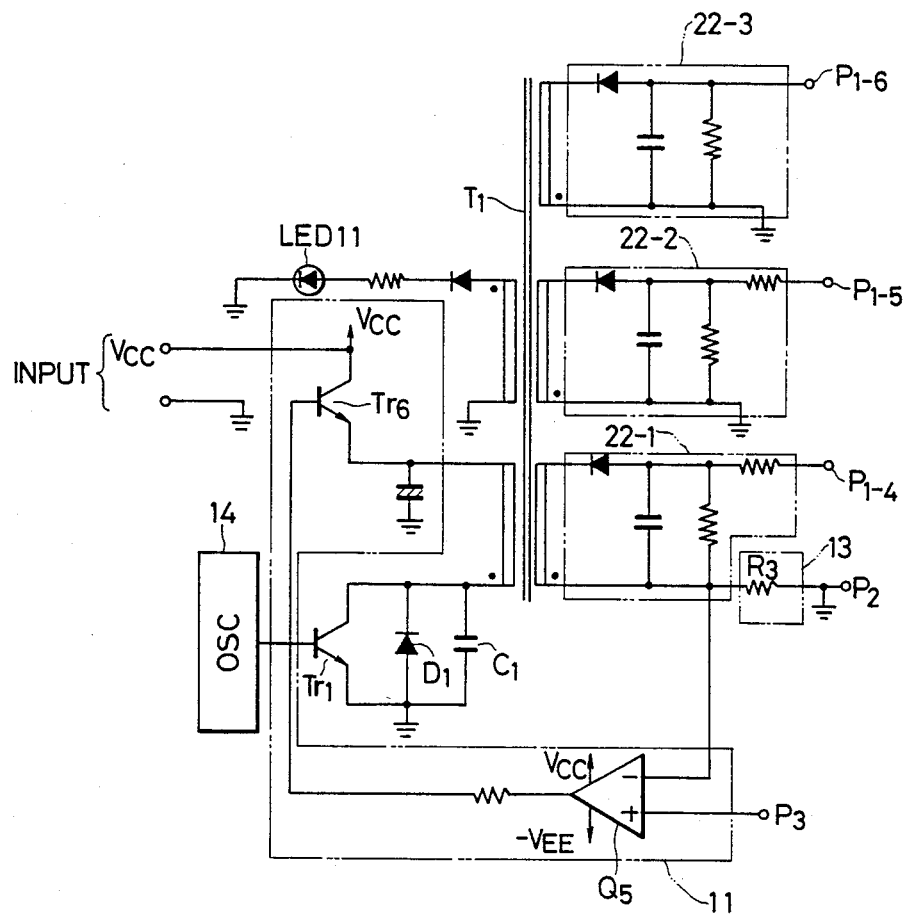
FIG. 9 shows another embodiment which supplies power to a plurality of loads from a plurality of secondary windings.

FIG. 9 shows another embodiment of the present invention. In FIG. 9, the power supply unit shown in FIG. 5 is provided with a plurality of windings to produce multiple of outputs. That is, the flyback transformer T1 has a plurality of high voltage output windings and low voltage output windings. Numerals 22-1 and 22-2 denote power supply circuits to separate high voltage loads such as chargers and numeral 22-3 a power supply circuit to low voltage loads such as for sequence control. LED 11 denotes a diode for indicating the generation of the high voltage. In the circuit of FIG. 9, a load current of a load connected to a terminal $P_{1-4}$ is kept constant. A load current of a load connected to a terminal $P_{1-5}$ is affected by a load characteristic of the load connected to the terminal $P_{1-4}$. An error amplifier Q5 compares a voltage detected by a sampling resistor R3 with a reference voltage applied to a terminal P3 to control a voltage applied to a primary winding of the flyback transformer T1. As a result, the output waveform at the terminal $P_{1-4}$ is stabilized so that the load current of the load connected to the terminal $P_{1-4}$ is precisely kept constant.

According to the embodiment of FIG. 9, the efficiency is high and the loss of the power regulation circuit 11 for the constant current control is relatively small.

When the power supply unit of FIG. 9 is used for the electronic printing apparatus such as a copying machine, the charger which needs a constant load current is connected to the terminal $P_{1-4}$ and other chargers are connected to the terminal $P_{1-5}$. The terminal $P_{1-6}$ may be connected to the low voltage loads for the developing bias, sequence control and display. Since the stable powers can be supplied to the high voltage and low voltage loads by one transformer, the compact and light copying machine can be attained.

In the present embodiment, the power regulation circuit 11 controls the voltage applied to the primary winding of the flyback transformer T1. Alternatively, it may control the duty cycle. In this case, the power loss of the power regulation circuit 11 can be significantly reduced. As a result, the power supply unit is further compacted in size and reduced in weight and the allowable variation range of the input power supply voltage Vcc can be widened and the temperature rise of the associated equipments can be suppressed. Alternatively, the duty cycle of the oscillation circuit 14 may be controlled or the drive frequency of the switching transistor may be varied.

As described hereinabove, according to the present invention, the power supply unit which is compact and light and has a high efficiency and low noise is provided. It can supply stable power to the high voltage and low voltage loads by one transformer. Thus, the highly reliable power supply unit which can precisely keep the load current of the selected one of the plurality of loads at a constant level is provided.

Figure 10:
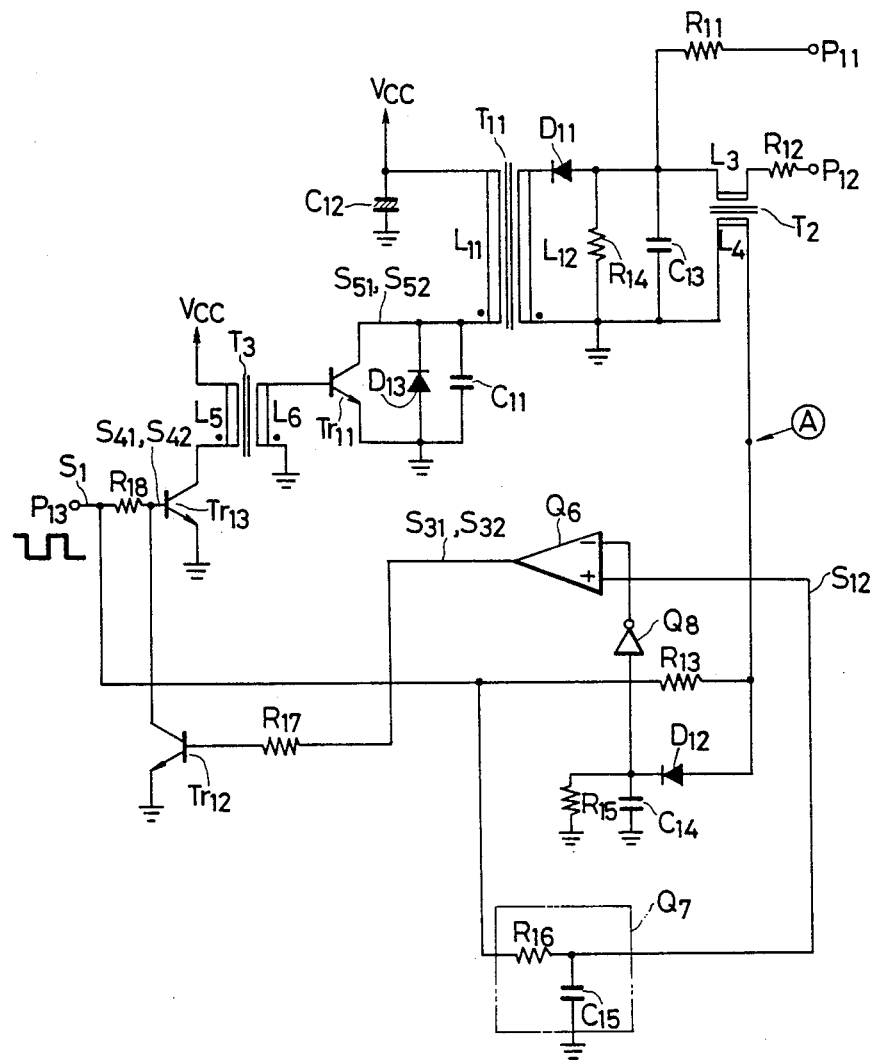
FIG. 10 shows a circuit diagram of a power supply unit which supplies power to a plurality of loads from a single primary winding.

FIG. 10 shows another embodiment of the present invention. T11 denotes a high voltage converter transformer (high voltage transformer), one end of a primary winding L11 of which is connected to a collector of transformer driving main switching transistor Tr1 of a grounded emitter configuration and a cathode of a diode D13 having an anode thereof grounded and a capacitor C11 connected in parallel are connected to the collector and the one end of the primary winding L11. The other end of the primary winding L11 of the converter transformer T11 is connected to a power supply voltage Vcc and to a filtering electrolytic capacitor C12 having the other end thereof grounded. One end of a secondary winding L12 of the converter transformer T11 is connected to a forward directed high voltage rectifying diode D11 having an anode thereof connected to a parallel circuit of a resistor R14 and a capacitor C13 having the other ends thereof grounded. In this manner, a high voltage rectification circuit is constructed. T2 denotes a current transformer having a high squareness ratio core. It is inserted between a rectified output of the diode D11 and a terminal P12. When a load current flowing through the terminal P12 exceeds a predetermined level, magnetic flux of the current transformer T2 saturates.

T3 denotes a base driving transformer for driving a base of the main switching transistor connected to one end of an secondary winding L6 thereof. The other end of the winding L6 is grounded and one end of a primary winding L5 of the transformer T3 is connected to the power supply voltage Vcc and the other end thereof is connected to a collector of a base driving transistor Tr13 of a grounded emitter configuration. A base of the transistor Tr13 is connected to a switching drive input terminal P13 through a resistor R18 and an external driving pulse is applied to the terminal P13 from an external oscillator. As the main switching transistor Tr11 is switched by the external driving pulse applied to the terminal P13, a negative high voltage is developed at the secondary rectified output of the converter transformer T11.

The high voltage is supplied to high voltage loads (e.g. chargers) connected to high voltage load terminals P11 and P12 through resistors R11 and R12, respectively. The resistors R11 and R12 prevent arc discharge and independently define the load currents at the terminals P11 and P12. It is now assumed that the high voltage load connected to the terminal P12 requires a strict constant current characteristic and is not permitted to be influenced by the load variation of the load connected to the other terminal P11. Thus, the current transformer T2 for detecting the load current is connected to only the terminal P12 of the high voltage load which requires the strict constant current characteristic, through the resistor R12.

One end of a secondary winding L4 of the current transformer T2 is grounded and the other end thereof is connected to an anode of a rectifying diode D12 and a cathode thereof is connected to a capacitor C14 and a resistor R15 having the other ends thereof grounded. In this manner, a rectification circuit is constructed. Q6 denotes a comparator. An inverter Q8 is connected between a (−) input terminal of the comparator Q6 and the cathode of the diode D12, and an integration circuit Q7 is inserted between a (+) input terminal of the comparator Q6 and the input terminal P13. The integration circuit Q7 may comprise a capacitor C15 having one end grounded and a series resistor R16. The terminal P13 and the secondary winding L4 of the current transformer T2 is connected through a resistor R13. An output terminal of the comparator Q6 is connected to a base of a transistor Tr12 of a grounded emitter configuration through a resistor R17, and a collector of the transistor Tr12 is connected to the junction of the resistor R18 and the base of the transistor Tr13.

Figure 11:
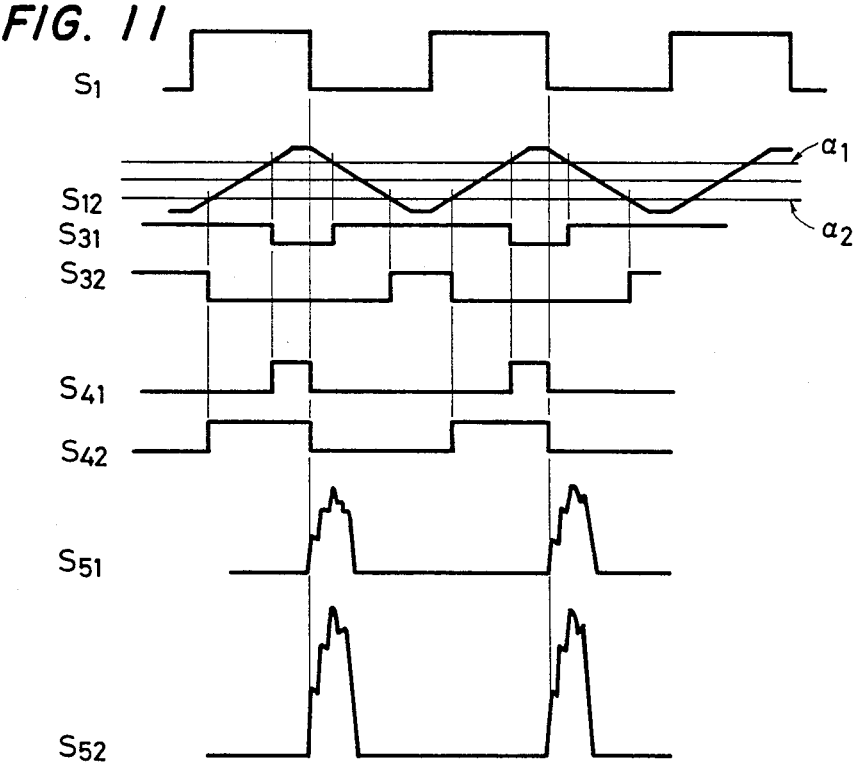
FIG. 11 shows operation waveforms in the circuit of FIG. 10.

The operation of the circuit of FIG. 10 is now explained with reference to waveforms shown in FIG. 11.

At the start of operation, the transistor Tr12 is nonconductive. When the external drive pulse S1 is supplied to the input terminal P13, the main switching transistor Tr11 conducts (turns on) and energy is stored in the primary winding L11 of the converter transformer T11. As the transistor Tr1 is subsequently rendered non-conductive (turned off), an output of a constant pulse width is produced at the collector from the winding L11 and a negative high voltage is induced at the rectified output of the secondary winding L12 of the converter transformer T11. This operation is basically identical to that explained in connection with FIG. 3.

The high voltage is supplied to the high voltage loads connected to the terminals P11 and P12. A variation of the load current of the load which requires the strict constant current characteristic is detected by the current transformer T2 connected in series with that high voltage load through the terminal P12. When the load current flowing through the terminal P12 exceeds a predetermined level, the magnetic flux of the current transformer T2 saturates, but since the external driving pulse S1 applied to the input terminal P13 is supplied to the winding L4 of the current transformer T2 through the resistor R13, a pulse signal of the same waveform as the pulse S1 is produced at a point A in FIG. 10 until the magnetic flux of the current transformer T2 saturates. The pulse signal is rectified and filtered by the diode D12 and the capacitor C14 and then it is inverted by the inverter Q8 and applied to the (−) input terminal of the comparator Q6.

The (−) input level of the comparator Q6 is, for example, $\alpha_2$ (in FIG. 11) by the inversion by the inverter Q8. Since the signal S12 which is the integration of the drive pulse S1 applied to the terminal P13, by the integration circuit Q7 is applied to the (+) input terminal of the comparator Q6, the comparator Q6 produces the output S32 until the magnetic flux of the current transformer T2 saturates. Since the transistor Tr12 is conducted during the high level period of the output S32, an output S42 which is a difference between the drive pulse S1 and the output S32 is applied to the base of the transistor Tr13. Thus, the transistors Tr13 and Tr11 are conducted during the high level period of the output S42 and an energy is stored in the converter transformer T11. Immediately after the turn-off of the transistor Tr11, an output S52 of a constant pulse width is produced at the collector of the transistor Tr11 and a negative high voltage is produced across the secondary winding of the transformer T11.

On the other hand, when the load current flowing through the terminal P12 exceeds the predetermined level, the magnetic flux of the current transformer T2 saturates and the potential at the point A in FIG. 10 falls to zero volts and the (−) input terminal of the comparator Q6 assumes a level $\alpha_1$. Accordingly, the output of the comparator Q6 assumes S31 and the drive pulse of the transistor Tr13 assumes S41. The transistors Tr13 and Tr11 are conducted during the high level period of the pulse S41 and an energy is stored in the converter transformer T11. The energy storage time of the transformer T11 varies in accordance with the pulse width of the drive signal of the transistor Tr11 so that the output energy varies. Thus, the collector output of the transistor Tr11 assumes S51.

The collector output of the transistor Tr11 changes between S51 and S52 depending on the load current detected by the current transformer T2 so that the load current flowing through the terminal P12 is kept at the constant level determined by the saturation magnetic flux density of the current transformer T2.

As described hereinabove, according to the present invention, a plurality of outputs are taken out from the single secondary winding and the variation of the load current to the load which requires the high stabilization is selectively detected and the detected variation is fed back to the driving switching circuit of the high voltage transformer to regulate the current or the voltage to the constant level. Accordingly, the current to the selected load is precisely stabilized without being affected by the load characteristics of the other loads. Since the secondary high voltage winding need not be plural, the power supply unit is compact and inexpensive. Thus, by utilizing the power supply unit of the present invention, an electrostatic printing apparatus of high image quality can be provided. In the circuit of FIG. 10, the voltage applied to the primary winding of the transformer T11 or the duty cycle thereof may be controlled or the drive frequency of the transistor Tr13 may be varied.

Figure 12:
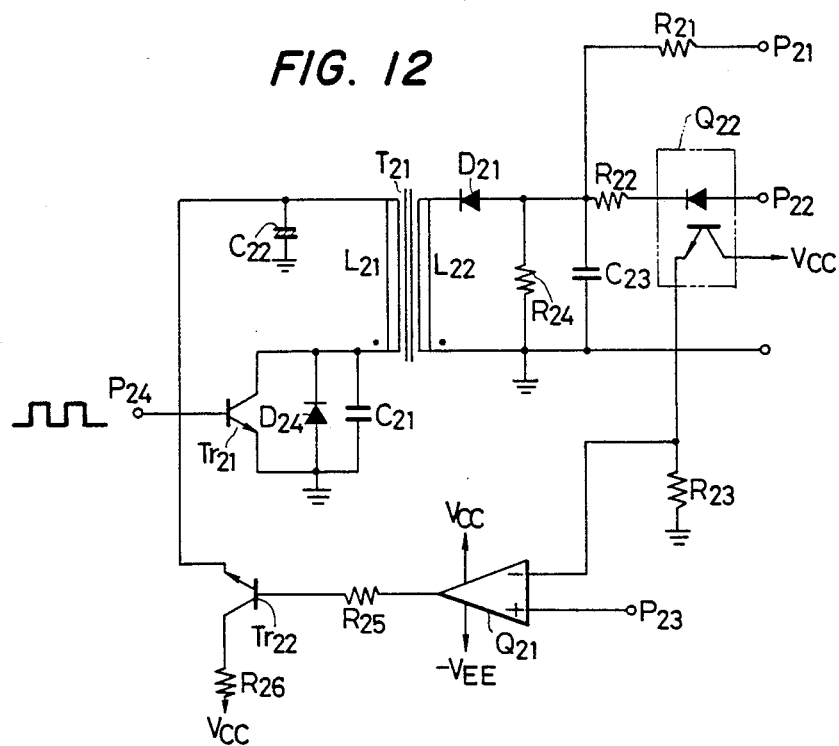
FIG. 12 shows a circuit diagram of a power supply unit which detects a load current by a photo-coupler to control the voltage applied to a primary winding of a transformer.

FIG. 12 shows another embodiment of the present invention. In FIG. 12, T21 denotes a high voltage converter transformer. One end of a primary winding L21 of which is connected to a collector of a switching transistor Tr21 of a grounded emitter configuration, and a parallel circuit of a diode D24 and a capacitor C21 having their other ends grounded is connected to the primary winding L21 and the collector of the transistor Tr21. The other end of the primary winding L21 of the transformer T21 is connected to an emitter of a buffer transistor Tr22 and the emitter of the transistor Tr22 is connected to a voltage supply Vcc through a resistor R26. The junction of the primary winding L21 and the emitter of the transistor Tr22 is connected to a filtering capacitor C22 having the other end thereof grounded. When the transistor Tr21 is switched by a pulse output of a constant frequency from an external oscillator applied to a switching drive input terminal P24 connected to the base of the switching transistor Tr21 while the transistor Tr22 conducts, a negative high voltage is produced at a rectified output terminal of the secondary winding L22 of the converter transformer T21. This operation is basically identical to that described in connection with FIG. 3.

The high voltage is supplied to high voltage loads (e.g. chargers) connected to high voltage load terminals P21 and P22 through resistors R21 and R22, respectively. The resistors R21 and R22 prevent arc discharge and independently define the load currents at the terminals P21 and P22. A parallel circuit of a resistor R24 and a capacitor C23 having their other ends grounded is connected to the junction of the resistors R21 and R22 and to an anode of a high voltage rectifying diode D21. In this manner, a high voltage rectifying circuit is constructed. A cathode of the diode D21 is connected to one end of a secondary winding L22 of the transformer T21 and the other end of the winding L22 is grounded. It is now assumed that the high voltage load connected to the terminal P22 requires a strict constant current characteristic and is not permitted to be influenced by the variation of the load current of the load connected to the other terminal P21. On the other hand, it is assumed that the load connected to the terminal P21 does not require a constant current characteristic and is permitted to follow a voltage-current characteristic at the terminal P22.

Thus, a light emitting diode of high breakdown voltage photo-coupler Q22 for detecting the load current is inserted between the terminal P22 and the resistor R22 with an anode thereof being connected to the terminal P22, and an emitter of a photo-transistor is grounded through a resistor R23 and a collector thereof is connected to the voltage supply Vcc. The junction of the emitter and the resistor R23 is connected to a (−) input terminal of an operational amplifier Q21 and a predetermined reference voltage is applied to a (+) input terminal thereof through a terminal P23, and an output terminal of the operational amplifier Q21 is connected to the base of the transistor Tr22 through a resistor R25.

The operation of the circuit of FIG. 12 is now described.

At the start of operation, since no voltage is applied to the (−) input terminal of the operational amplifier Q21, a positive terminal output from the output terminal thereof is supplied to the base of the transistor Tr22. During the conduction of the transistor Tr21, if the output pulse of the external oscillator is applied from the input terminal P24 to the base of the switching transistor Tr21 to conduct the transistor Tr21, energy is stored in the primary winding L21 of the converter transformer T21. When the transistor Tr21 is subsequently turned off, a pulse output of a constant pulse width from the winding L21 is produced at the collector and a negative high voltage is induced at the rectified output of the secondary winding L22 of the converter transformer T21.

The high voltage is supplied to the high voltage loads connected to the terminals P21 and P22. The load current flowing through the photodiode of the photo-coupler Q22 connected in series with the terminal P22 is electro-optically converted so that the photo-transistor produces an emitter current. The emitter current is converted to a voltage by the resistor R23 and the voltage is supplied to the (−) input terminal of the operational amplifier Q21 in which it is compared with the reference voltage applied to the terminal P23. The output of the operational amplifier Q21 is supplied to the base of the transistor Tr22 through the resistor R25 to conduct the transistor Tr22.

Since the emitter current of the photo-coupler Q22 is proportional to the load current flowing through the terminal P22, the transistor Tr22 is rendered non-conductive if the load current varies beyond the setting determined by the reference voltage applied to the terminal P23 and the transistor Tr22 is conductive in other conditions. When the transistor Tr22 is non-conductive, no energy is stored in the converter transformer T1 irrespective of the presence or absence of the oscillator output. Accordingly, the voltage applied to the primary winding of the converter transformer T21 can be controlled by the output of the operational amplifier Q21 to keep the load current flowing through the terminal P22 at the constant level. As described hereinabove, since the plurality of outputs are taken out from one secondary winding L22 of the transformer T21 and the current to the selected load which requires the high stabilization is selectively detected to stabilize the current, the current is not influenced by the load characteristics of the other loads. Accordingly, a compact, inexpensive and highly reliable power supply unit can be provided. By utilizing the power supply unit of the present invention, an inexpensive electrostatic printing apparatus of high image quality is provided.

Figure 13:
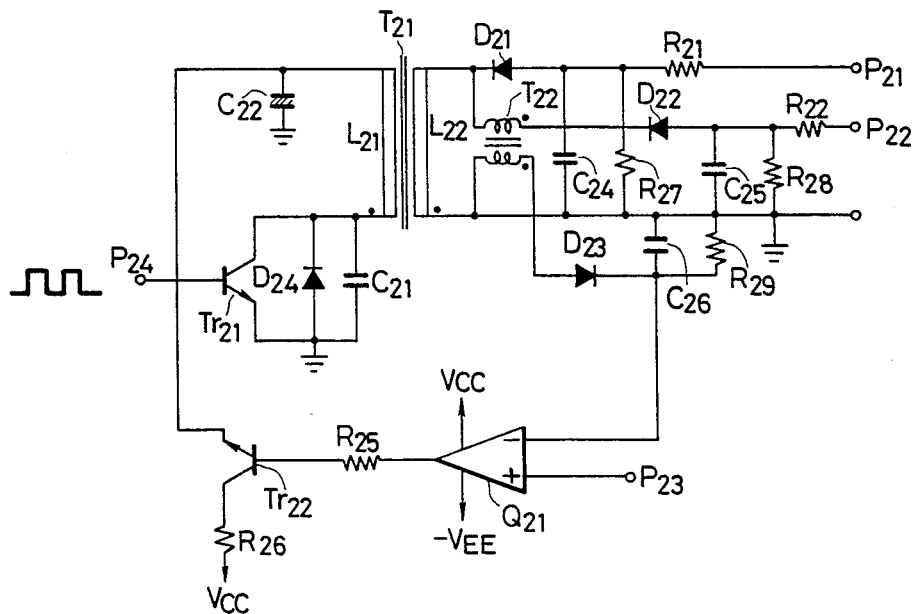
FIG. 13 shows a circuit diagram of a power supply unit which uses a current transformer instead of the photo-coupler of FIG. 12.

FIG. 13 shows another embodiment of the power supply unit of the present invention which uses a current transformer T22 instead of the photo-coupler Q22 of FIG. 12 as the load current detecting means. Similar functional elements to those of FIG. 12 are designated by like numerals. In FIG. 13, one end of the primary winding of the current transformer T22 is connected to the secondary winding L22 of the converter transformer T21 and the other end thereof is connected to a cathode of a diode D22 which is connected to the terminal P22 through the series resistor R22. One end of the secondary winding of the current transformer T22 is grounded and the other end thereof is connected to the (−) input terminal of the operational amplifier Q21 through a diode D23. A parallel circuit of a capacitor C24 and a resistor R27 having their other ends grounded is connected to an anode of the diode D21 to form a rectifying circuit, a parallel circuit of a capacitor C25 and a resistor R28 having their other ends grounded is connected to an anode of the diode D22 to form a rectifying circuit, and a parallel circuit of a capacitor C26 and a resistor R29 having their other ends grounded is connected to a cathode of the diode D23 to form a rectifying circuit. The other construction is the same as that shown in FIG. 12 and hence the detail thereof is omitted here.

The current transformer T22 is connected in series with the load connected to the terminal P22 to detect the variation of the current flowing through the load, and the detected signal is compared with the reference voltage by the operational amplifier Q21 to control the drive voltage of the primary winding of the transformer T21 such that the load current at the terminal P22 is kept constant. In the present embodiment, the number of high voltage rectifying circuits is larger than that of the embodiment of FIG. 12, but since the load current is detected by the current transformer T22, the deviation of the load current from the preset level due to the variation of the conversion efficiency of the photo-coupler Q22 is eliminated. While the embodiments shown in FIGS. 12 and 13 have two high voltage loads, respectively, if the loads do not require constant current the load current need not be detected and hence the number of high voltage loads may be increased. Accordingly, a compact and inexpensive power supply unit can be provided while attaining equal or better constant current characteristics to or than that of a prior art power supply unit. It should be understood that multiple outputs can be taken out from the single winding of the converter transformer T21 even for the loads of opposite polarities.

The embodiments described above show the series regulation system in which the detected current representing the load current is compared with the reference voltage and the voltage applied to the primary winding of the converter transformer T21 is controlled by the resulting error output. Embodiments of the present invention which use the switching regulation system in which the duty cycle of the primary winding of the converter transformer T21 by error output, are shown in FIGS. 14–17.

Figure 14:
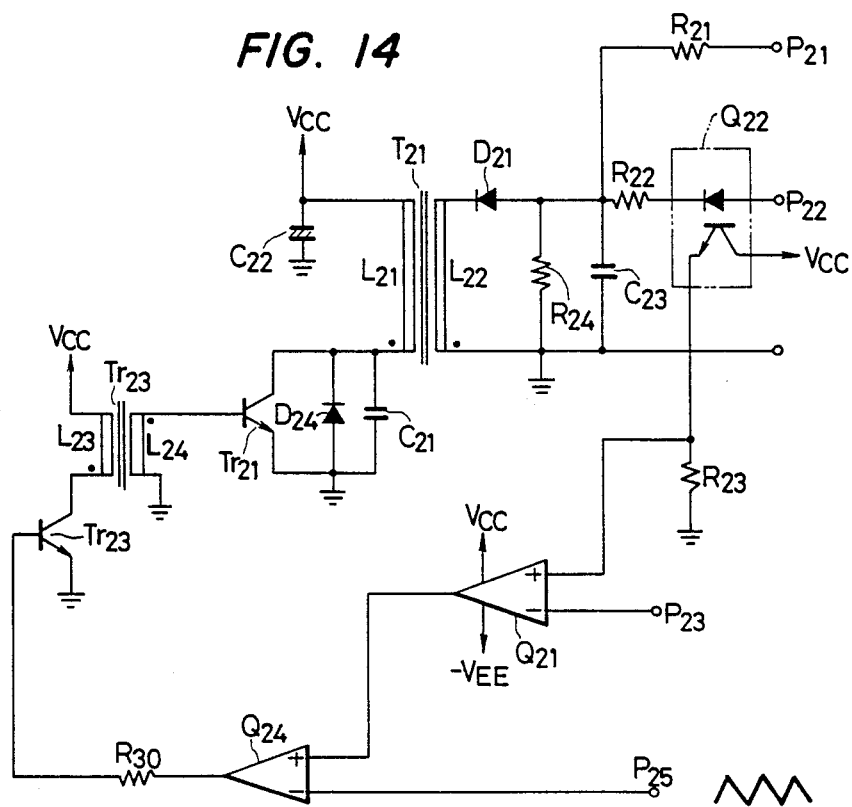
FIG. 14 shows a circuit diagram of a power supply unit which supplies power to a plurality of a single secondary winding to control a duty cycle of a primary winding of a transformer.

FIG. 14 shows one embodiment of the power supply unit of the present invention which controls a pulse width of a drive signal of a switching transistor Tr21 in a primary winding circuit of a high voltage transformer T21 to control the duty cycle of the primary winding of the high voltage transformer T21. T23 denotes a base drive transformer and one end of a secondary winding L24 thereof is connected to a base of the main switching transistor Tr21 and the other end of the secondary winding L24 is grounded, and one end of a primary winding L23 is connected to a power supply voltage Vcc and the other end thereof is connected to a collector of a base drive transistor Tr23. An emitter of the transistor Tr23 is grounded and a base thereof is connected to an output terminal of a comparator Q24 through a resistor R30. An error output of an operational amplifier Q21 is supplied to a (+) input terminal of the comparator Q24 and a triangle wave of a predetermined frequency applied to a terminal P25 is supplied to a (−) input terminal of the comparator Q24. One end of a primary winding L21 of the converter transformer T21 is directly connected to the power supply voltage Vcc. The other construction is same as that of the embodiment of FIGS. 12 or 13.

A load current flowing through a terminal P22 is detected by a photo-coupler Q22 or the current transformer T22 described above and the detected current is compared with a reference voltage applied to the terminal P23 by the operational amplifier Q21, and the output (error output) is supplied to the (+) input terminal of the comparator Q24 which compares it with the triangle wave of the predetermined frequency applied to the terminal P25 to effect time-ratio conversion, and the converted output is supplied to the base of the transistor Tr23 through a resistor R30. Since the energy storage time of the base drive transformer T23 changes in accordance with the conduction state of the transistor Tr23, the pulse width of the drive signal of the main switching transistor Tr21 is varied accordingly to control the conduction period of the transistor Tr21 to control the duty cycle of the primary winding of the converter transformer T21.

As described hereinabove, in the present embodiment, the detected output of the load current is compared with the reference to vary the pulse width of the drive signal of the switching transistor Tr21 in the primary winding circuit of the high voltage transformer T21. Accordingly, the voltage of the load connected to the terminal P22 is kept constant without being affected by the characteristics of the other loads and hence a high efficiency and compact power supply unit can be provided.

Figure 15:
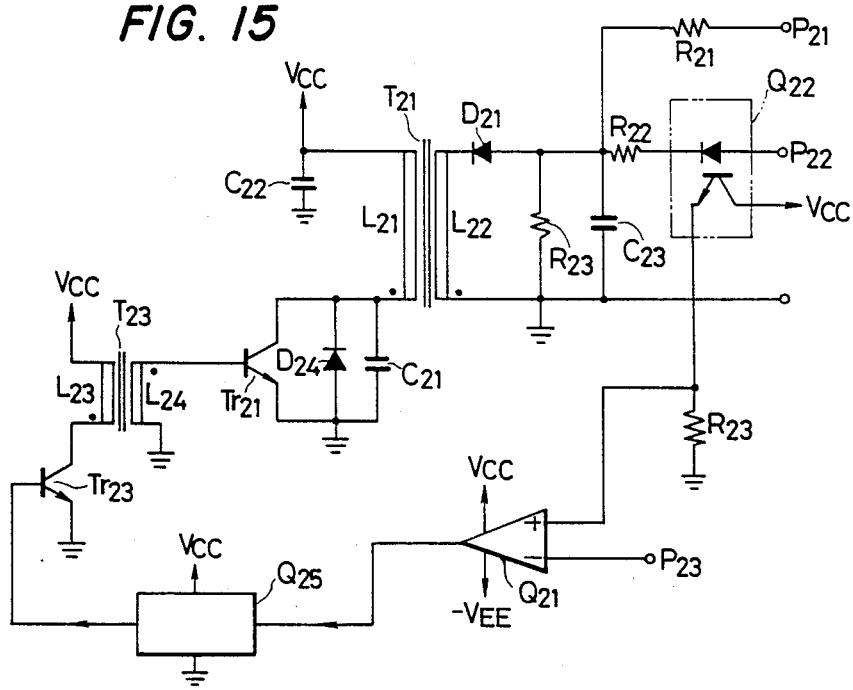
FIG. 15 shows a circuit diagram of a power supply unit which uses a controlled variable frequency oscillator Q25 instead of a comparator Q24 of FIG. 14.

FIG. 15 shows an embodiment of the power supply unit of the present invention which uses a voltage controlled variable frequency oscillator Q25 instead of the comparator Q24 of FIG. 14 to vary the drive frequency of the main switching transistor Tr21 to control the duty cycle of the primary winding of the high voltage transformer T21. The output of the operational amplifier Q21 is supplied to the oscillator Q25 and the output of the oscillator Q25 is supplied to the base of the transistor Tr23. The other configuration is the same as that of the embodiment of FIG. 14 and hence the detail thereof is not explained here.

Since the pulse width of the collector voltage of the main switching transistor Tr21 is determined by an inductance L21 and an equivalent capacitance C′ as seen from the primary winding of the converter transformer T21 and a capacitance of an external capacitor C21, it is not affected by the drive frequency of the transistor Tr21. Thus, by varying the drive frequency through the voltage controlled variable frequency oscillator Q25 in accordance with the variation of the load current, the conduction period of the transistor Tr21, that is, the energy storage time of the transformer T21 can be varied so that the secondary output voltage is kept constant.

Figure 16:
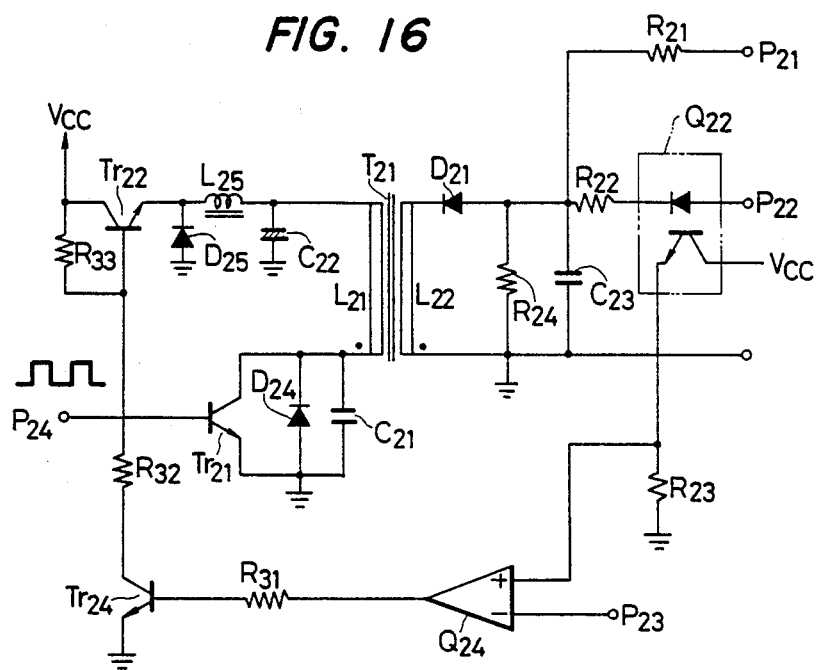
FIG. 16 shows a circuit diagram of a power supply unit which uses a self-excited switching regulator instead of a series regulator of FIG. 13.

FIG. 16 shows one embodiment of the power supply unit of the present invention in which the series regulator of FIG. 12 or 13 is substituted by a self-excited switching regulator. An inductor L25 is connected in series between the emitter of the transistor Tr22 and the primary winding L21 of the converter transformer T21, a cathode of a diode D25 having an anode thereof grounded is connected to the junction of the inductor L25 and the emitter of the transistor Tr22, and an electrolytic capacitor C22 having one end thereof grounded is connected to the junction of the inductor L25 and the primary winding L21 of the converter transformer T21 to form a step-down chopper circuit. A resistor R33 is connected between the collector of the transistor Tr22 to which the power supply voltage Vcc is applied and the base, and the base is connected to the collector of the transistor Tr24 through a resistor R23. The base of the transistor Tr24 is connected to the output terminal of the comparator Q24 through a resistor R31 and the emitter thereof is grounded to form a self-excited switching regulator. The other construction is the same as that of the embodiment of FIGS. 12 or 13.

The variation of the load current flowing through the terminal P22 is detected by the photo-coupler Q22 or the current transformer T22 and the detected output is supplied to the (+) input terminal of the comparator Q24 which compares it with the reference voltage applied to the terminal P23 and supplies the output to the base of the transistor Tr24 through the resistor R31. Thus, the power supply transistor Tr22 of the primary winding L21 of the high voltage transformer T21 is switched to control the duty cycle of the primary winding of the high voltage transformer T21 to keep the secondary output voltage at the constant level.

Figure 17:
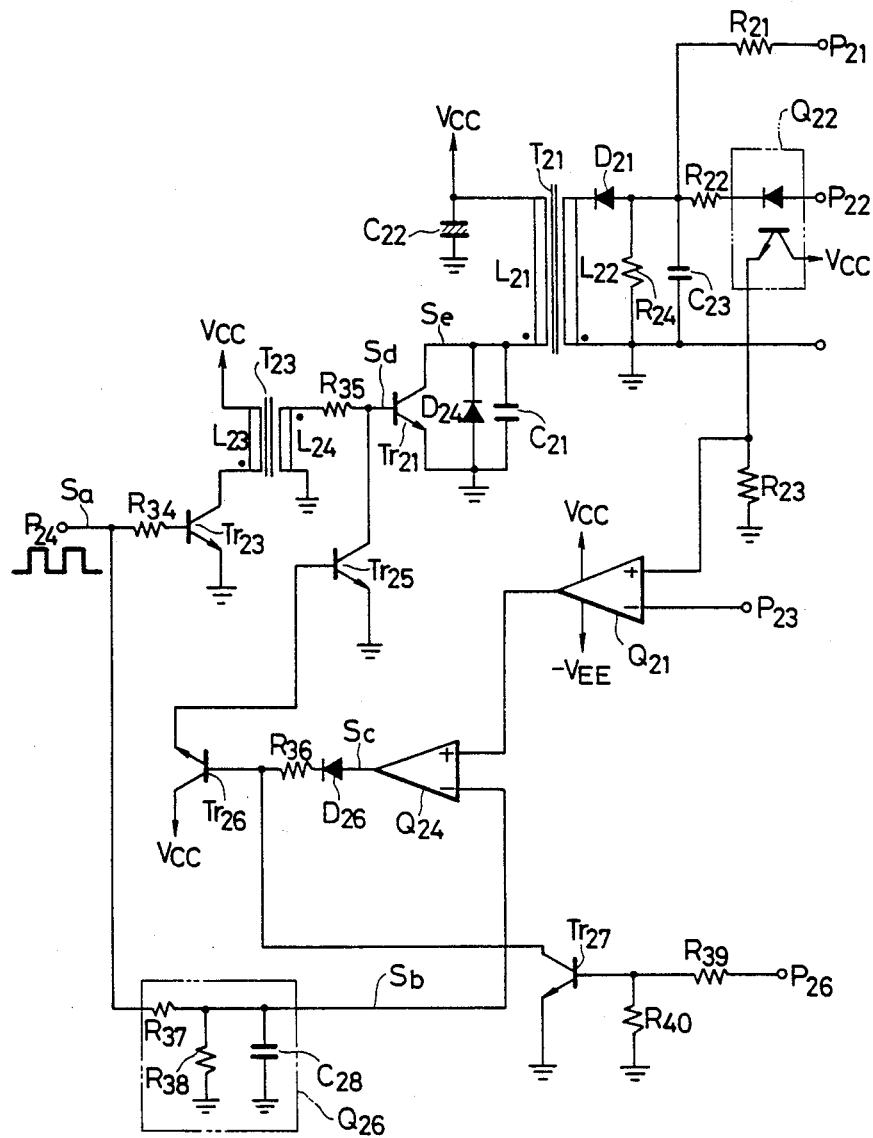
FIG. 17 shows a circuit diagram of a power supply unit which uses an integrated waveform of a transformer drive s a compare reference to control a pulse duration.

FIG. 17 shows one embodiment of the power supply unit of the present invention which controls the pulse width by utilizing the integration waveform of the drive signal as a compare reference. P24 denotes a drive signal input terminal which is connected to the base of the transistor Tr23 through a resistor R24 and to which a pulse signal of a predetermined frequency is applied from an external oscillator. An integration circuit Q26 comprising resistors R37 and R38 and a capacitor C28 is inserted between the junction of the terminal P24 and the resistor R34 and the (−) input terminal of the comparator Q24, and the integrated waveform of the drive signal is supplied to the comparator Q24 as a compare reference. The resistor R37 is connected in series and the resistor R38 and the capacitor C28 having their ends grounded are connected in parallel to form the integration circuit Q26.

The output of the comparator Q24 is connected to the base of the transistor Tr26 through a forward-biased back current blocking diode D26 and a resistor R36 so that the transistor Tr26 is rendered conductive by the output of the comparator Q24. The collector of the transistor Tr26 is connected to the power supply voltage Vcc and the emitter thereof is connected to a base of a transistor Tr25 of a grounded emitter configuration, and a collector of the transistor Tr25 is connected to the junction of the base of the main switching transistor Tr21 and the resistor R35, which is inserted in series between the secondary winding L24 of the base driving transformer T23 and the base of the transistor Tr21. Accordingly, as the transistor Tr26 conducts, the transistor Tr25 is rendered conductive and the output at the secondary winding of the transformer T23 flows to the ground through the emitter of the transistor Tr25. Thus, the transistor Tr21 is rendered nonconductive in accordance with the output of the comparator Q24.

The collector of a transistor Tr27 of grounded emitter configuration is connected to the junction of the base of the transistor Tr26 and the resistor R36, and the base of the transistor Tr27 is connected to a resistor R39 having the other end thereof to a terminal P26 to which an on-off controlling external remote signal is applied and to a resistor R40 having the other end thereof grounded. Those elements form a start circuit. At the start of operation, a start voltage is applied to the terminal P26 to conduct the transistor Tr27 so that the transistor Tr26 is forcibly rendered nonconductive irrespective of the output of the comparator Q24. Thus, the base drive pulse applied to the terminal P24 is directly supplied to the base of the main switching transistor Tr21 to start the converter transformer T21. The other construction is the same as that of the embodiment of FIG. 14.

Figure 18:
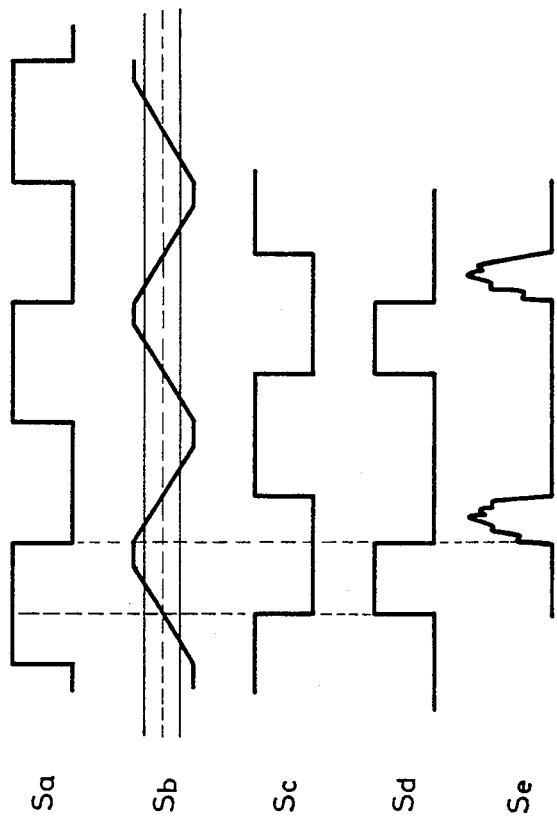
FIG. 18 shows operation waveforms of the circuit of FIG. 17.

The operation of the circuit of FIG. 17 is now described with reference to waveforms shown in FIG. 18.

When a negative high voltage is developed at the rectified output of the secondary winding L22 of the converter transformer T21 as it is started, the load current flowing through the terminal P22 is electro-optically converted by the photo-coupler Q22 and the photo-transistor produces an emitter current. The emitter current is converted to a voltage by the resistor R23 and the voltage is supplied to the (+) input terminal of the operational amplifier Q21 which compares it with the reference voltage applied to the terminal P23, and the resulting compare output is supplied to the (+) input terminal of the comparator Q24.

On the other hand, an integrated waveform Sb derived by integrating a pulse (drive signal) Sa of a predetermined frequency continuously applied to the terminal P24, by the integration circuit Q26 is supplied to the (—) input terminal of the comparator Q24 which compares it with the output of the operational amplifier Q21 applied to the (+) input terminal thereof. The comparator Q24 produces a pulse output Sc as shown in FIG. 18 in accordance with the output of amplifier Q21. The pulse output Sc is supplied to the base of the transistor Tr26 through the diode D26 and the resistor R36 to conduct the transistor Tr26. As the transistor Tr26 conducts, the transistor Tr25 of grounded emitter configuration is rendered conductive and the base voltage of the main switching transistor Tr21 is forcibly dropped to zero volts during the high level period of the pulse output Sc.

As a result, the signal applied to the base of the main switching transistor Tr21 is a difference signal Sd between the drive signal Sa and the output signal of the comparator Q24 and the transistor Tr21 is rendered conductive only during the high level period of the signal Sd and the energy is stored in the converter transformer (high voltage transformer) T21. Thus, immediately after the turn-off of the transistor Tr21, an output Se of a constant pulse width is produced at the collector and a negative high voltage is produced at the secondary winding of the transformer T21.

Since the drive pulse width of the main switching transistor Tr21 is varied in accordance with the variation of the load current, the voltage or the current of the load which requires high stabilization can be precisely stabilized.

In the embodiments of FIGS. 14–17, the photo-coupler Q22 is used as the means to detect the load current.

It should be understood that the current transformer T22 as shown in FIG. 13 may be used to detect the load current.

As described hereinabove, according to the present invention, multiple outputs are taken out from the single secondary winding of the high voltage transformer and the output to the selected load which requires high stabilization is selectively detected and the detected signal is fed back to the drive switching circuit of the high voltage transformer to keep the current or voltage constant. Accordingly, highly precise stabilization is attained without being affected by the load characteristics of the other loads and a compact and inexpensive power supply unit is provided. By utilizing the power supply unit of the present invention, a compact and inexpensive electrostatic printing apparatus of high image quality can be readily provided.

Figure 19:
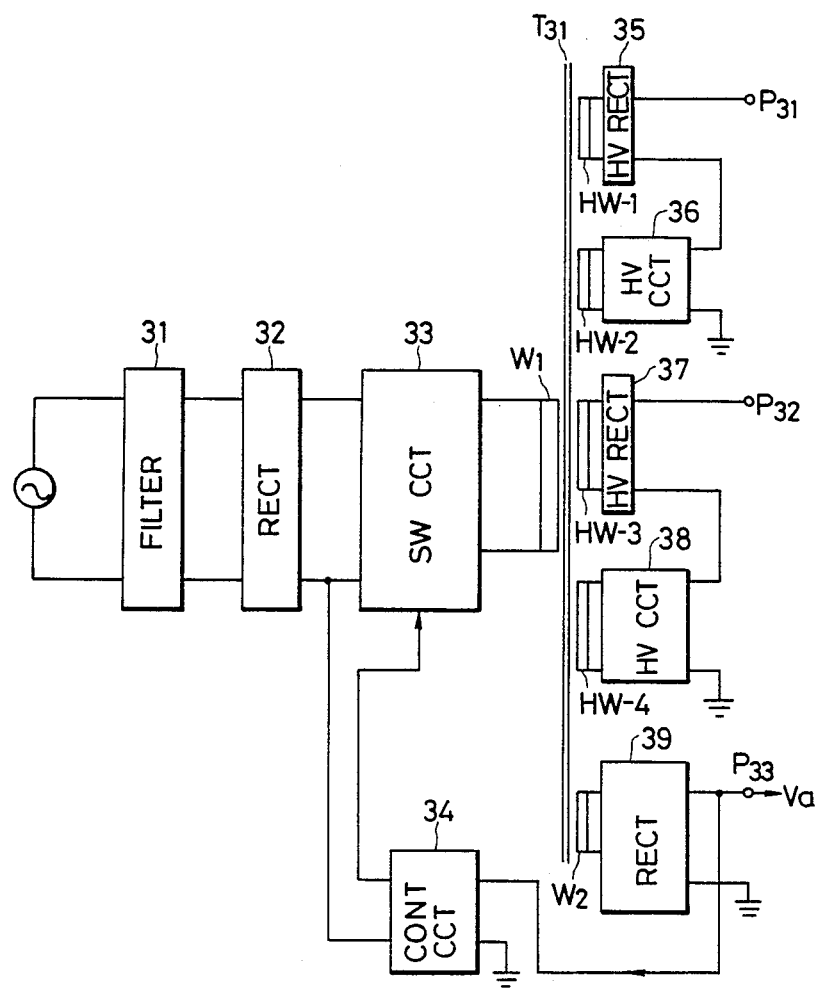
FIG. 19 shows a block diagram of a power supply unit which supplies power to a high voltage load by first and second high voltage power supplies.

FIG. 19 shows another embodiment of the present invention, in which the present power supply unit is incorporated in a recording apparatus such as a copying machine as shown in FIG. 2. Numeral 31 denotes a line filter to which an A.C. voltage is supplied, numeral 32 denotes a rectification circuit which rectifies and smoothens a line input from the line filter 31, and numeral 33 denotes a switching circuit to which a rectified output of the rectification circuit 32 is supplied and which forms a self-excited switching power supply circuit together with a primary winding W1 of a converter transformer T31. The switching circuit 33 includes a protection circuit for an output short circuit. Numeral 34 denotes a control circuit for controlling the switching circuit 33, and numerals 35 and 37 denote high voltage rectification circuits for chargers, which are connected to secondary windings HW-1 and HW-3, respectively, of the converter transformer T31 to form a first high voltage power supply circuit. Powers are supplied to the charger 4 and the transfer charger 8, for example, shown in FIG. 3 through terminals P31 and P32, respectively. The switching circuit 33 and the control circuit 34 may be those shown in the previous embodiments.

Numerals 36 and 38 denote high voltage circuits (middle high voltage generation circuits) which are connected to secondary windings HW-2 and HW-4, respectively, to form second high voltage power supply circuits. They are connected to ends of the secondary windings HW-1 and HW-3 of the high voltage rectification circuits 35 and 37, respectively, to supply approximately 10–30% of the voltages to be applied to the chargers. Numeral 39 denotes a low voltage rectification circuit for a sequence controller and it supplies power to a sequence control circuit as well as solenoids, clutches and relays of the sequence controller and lamps such as halogen lamps, through a terminal P33. An output voltage Va of the rectification circuit 39 is compared with a reference voltage by the control circuit 34, which controls a duty cycle of the switching circuit 33 in accordance with an error output to stabilize the output voltage Va of the rectification circuit 39. In the present embodiment the output voltages of the high voltage rectification circuits 35 and 37 for the chargers are $-4.5$ KV and the high voltage circuits 36 and 38 produce variable outputs of $-100$ V $\sim -1000$ V. When the load variation characteristic of the high voltage loads connected to the terminals P31 and P32 are similar to each other or one of the load does not require constant current one of the high voltage circuits 36 and 38 may be omitted and the ends of the secondary windings HW-1 and HW-3 may be connected together.

Figure 20:
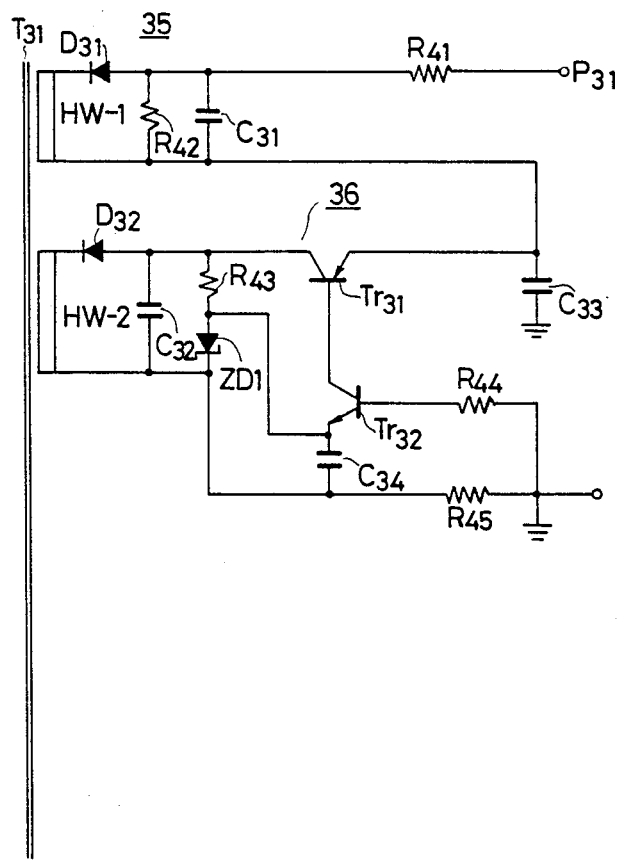
FIG. 20 shows a circuit diagram of the first and second high voltage power supplies shown in FIG. 19.

FIG. 20 shows an embodiment of the high voltage rectification circuit 35 and the high voltage circuit 36 of FIG. 19. The other high voltage rectification circuit 37 and the high voltage circuit 38 are similarly constructed. The high voltage rectification circuit 35 includes a resistor R41 inserted in series between the terminal P31 and the high voltage secondary winding HW-1, a high voltage rectifying diode D31 and a parallel circuit of a capacitor C31 and a resistor R42 connected in parallel between the resistor R41 and the diode D31.

One end of the secondary winding HW-1 and the other ends of the resistor R42 and the capacitor C31 are connected to an emitter of an emitter follower transistor Tr31 of the high voltage circuit 36 and a filtering capacitor C33 having one end grounded is connected to the junction of the emitter and the secondary winding HW-1. The high voltage circuit 36 includes the emitter follower transistor Tr31 and an error amplifier Tr32 to form a series regulator, and the output thereof is supplied to the one end of the high voltage secondary winding HW-1 as described above. A collector of the emitter follower transistor Tr31 is connected to one end of the secondary winding HW-2 through a rectifying diode D32 and a base thereof is connected to a collector of the error amplifier Tr32. A base of the error amplifier Tr32 is grounded through a resistor R44 and an emitter thereof is grounded through a capacitor C34 and a current sampling resistor R45. A capacitor C32 and a resistor R43 are connected in parallel between the diode D32 and the collector of the emitter follower transistor Tr31 to form the rectification circuit and a zener diode ZD1 is inserted between the resistor R43 and the ground, and the junction of the resistor R43 and the zener diode ZD1 is connected to the emitter of the error amplifier Tr32. The other end of the secondary winding HW-2, the other end of the capacitor C32 and the cathode of the zener diode ZD1 are grounded through a resistor R45.

The load current of the charger flows in a loop of the high voltage rectification circuit 35→the charger→the frame ground→the current sampling resistor R45→the secondary winding HV-2→the diode D32→the emitter follower transistor Tr31→the high voltage rectification circuit 35.

The voltage detected by the current sampling resistor R45 is compared with the zener voltage of the zener diode ZD1 by the error amplifier Tr32 to control the output of the high voltage circuit in order to keep the load current constant.

The high voltage circuit 36 or 38 may be constructed by a switching regulator instead of the series regulator. The emitter follower transistor Tr31 may be substituted by a resistor.

As described hereinabove, according to the present invention, a simple and relatively inexpensive high voltage circuit is used and the high voltage loads are stabilized to the same extent as in a prior art circuit in which a high voltage transformer is provided for each high voltage load. Thus, the highly precise stabilization is attained with a low cost.

The present invention can also improve a power efficiency. For example, when a variable output voltage of 5 KV-6 KV with an output current of 1 mA is required, the output of the high voltage circuit should produce 6.67 KV±10% if a variation of the transformer is ±10%. If the variation is maximum in positive direction at the efficiency of 50%, an input power of $\{(6.67 \text{ KV} \times 1.1) - 5.0 \text{ KV}\} \times 1 \text{ mA} \times (1/0.5) = 4.67$ watts is necessary.

On the other hand, when the outputs of the high voltage circuits 36 and 38 are varied between 0-1 KV, the required output of the high voltage circuit is (1 KV/0.9) = 1.11 KV under the same condition (transformer variation of ±10%). If the variation is maximum in the positive direction at the output of 1.11 KV, the required output is $1.11 \times 1.1 = 1.22$ KV. Accordingly, when the efficiency is 50%, the required power is $1.22 \text{ KV} \times 1 \text{ mA} \times (1/0.5) = 2.44$ watts. Thus, in the present embodiment, the power loss is decreased to approximately one-half.

Figure 21:
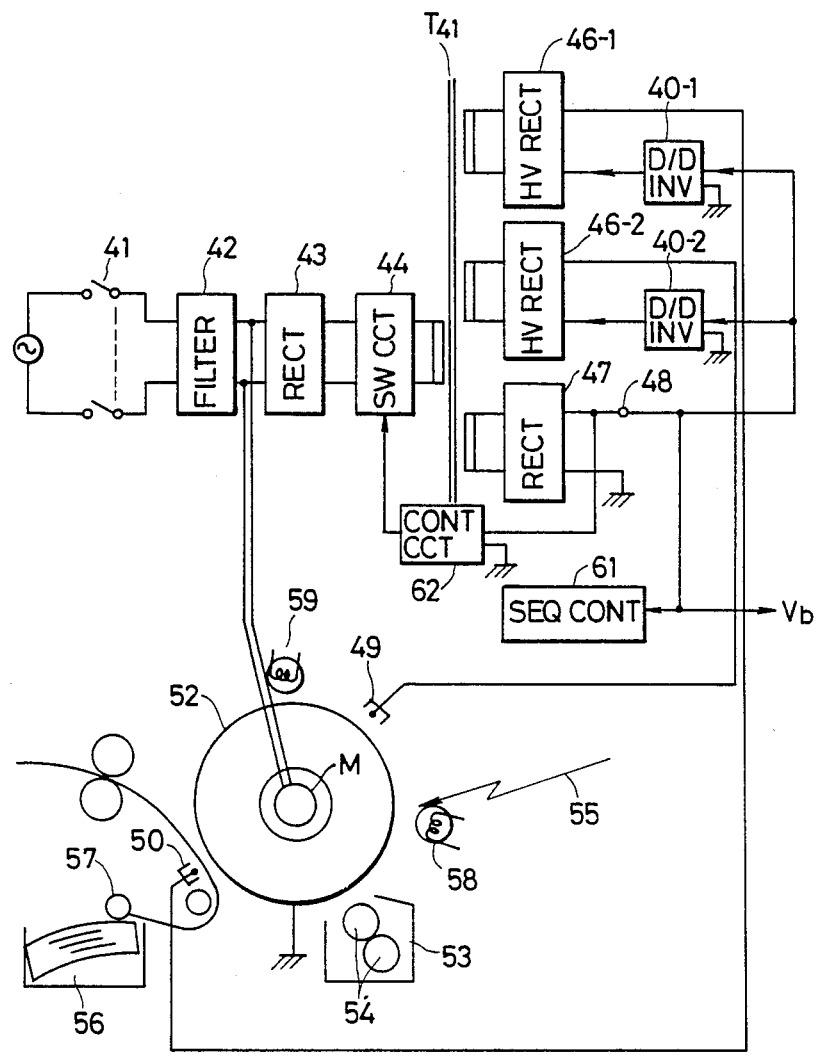
FIG. 21 shows an embodiment in which the present power supply unit is incorporated in a recording apparatus such as a copying machine.

FIG. 21 shows another embodiment of the present invention in which the present power supply unit is incorporated in a recording apparatus such as a copying machine. Numeral 41 denotes a power switch of an A.C. power supply, numeral 42 denotes a line filter to which an A.C. power is supplied through the switch 41, numeral 43 denotes a rectification circuit which rectifies and smoothens a line input from the line filter 42, and numeral 44 denotes a switching circuit for regulating a rectified output and it forms a self-excited switching power supply circuit together with a converter transformer T41. Numerals 46-1 and 46-2 denote high voltage rectification circuits for chargers. They are connected to secondary windings of the converter transformer T41 to form first high voltage supply circuits which supply powers to a primary charger 49 and a transfer charger 50, respectively. A main motor M is connected to an output terminal of the rectification circuit 42. When the power switch 41 is turned on, the main motor M is energized to rotate a photosensitive drum 52. Numeral 47 denotes a rectification circuit for a low voltage supply for a sequence controller and it supplies power to the sequence controller 61 comprising a sequence control circuit, sequence controller solenoids, clutches and relays, and to clamps including a predischarging lamp 59 and a blank exposure lamp 58 which is lit when a scanning light 55 is not applied, through a terminal 48, and to DC conversion means including DC-DC inverters 40-1 and 40-2. Numeral 53 denotes a developing unit, numeral 54 denotes a developing roller, numeral 55 denotes the scanning light to an original, numeral 56 denotes a paper feed cassette and numeral 57 denotes a paper feed roller.

A rectified output Vb of a sequence controller winding of the circuit 47 is compared with a reference voltage by a control circuit 62, and a conduction period of a switching transistor of a main winding of the switching circuit 44 is controlled such that the output voltage Vb is kept constant (24 volts). This operation is the same as that of the previous embodiment and it is not explained here. The numbers of turns of the high voltage windings of the circuits 46-1 and 46-2 are set such that the rectified outputs thereof are equal to lower limit voltages required to the chargers 49 and 50 less a margin 8, that is, $(V_{LOW} - \beta)$.

Figure 22:
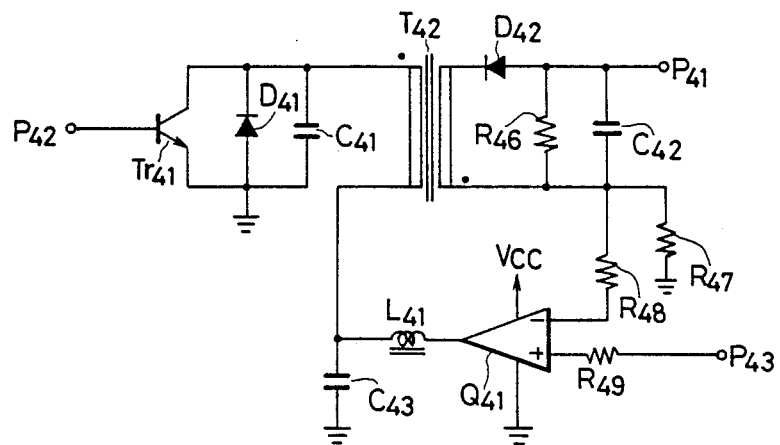
FIG. 22 shows a circuit diagram of a DC-DC converter shown in FIG. 21.

The terminals of the circuits 46-1 and 46-2 are connected to the output terminals of the DC-DC inverters 40-1 and 40-2, respectively. The outputs of the circuits 40-1 and 40-2 vary between $\beta$ and $(V_{upper} - V_{low}) + \beta$, where $V_{upper}$ is upper limit voltages required by the chargers 49 and 50. As shown in FIG. 22, the load current flowing through the charger 49 or 50 is detected by the resistor R47 and the circuit is controlled such that the detected current is equal to the reference applied to the terminal P43.

For example, the output voltages of the high voltage rectification circuits 46-1 and 46-2 for the chargers are set to −4.5 KV and the output voltages of the DC-DC inverters 40-1 and 40-2 are set to −100 V ∼ −1000 V. If the load variation characteristics of the chargers 49 and 50 are similar to each other, the ends of the secondary windings of the high voltage rectification circuits 46-1 and 46-2 may be connected together and one of the DC-DC inverters 40—1 and 40—2 may be omitted. A further reduction in cost is attained by omitting the control circuit 62.

In the present embodiment, the input to the control circuit 62 is taken out of the low voltage power supply circuit for the sequence controller. Alternatively, a rectification circuit for a constant load having a separate winding may be provided and a rectified output therefrom may be supplied to the control circuit. In this case, a variation of the high voltage winding output due to the connection and disconnection of the sequence controller load can be avoided. This modification will be further described later.

FIG. 22 shows an embodiment of the DC-DC inverter 40-1 or 40-2 shown in FIG. 21. A switching transistor Tr41, a diode D41 and a capacitor C41 connected to a primary winding of a converter transformer T42 form a switching circuit, and a rectifying diode D42 connected to a secondary winding of the transformer T42, resistors R46 and R47 and a capacitor C42 form a rectification circuit, and the rectification circuit is connected to a (−) input terminal of an operational amplifier Q41 through a resistor R48. The operational amplifier Q41, a reactor L41, a filtering capacitor C43 and a resistor R49 form a control circuit, and one end of the primary winding of the converter transformer T42 and the operational amplifier Q41 are connected through the smoothening reactor L41. A terminal P41 is connected to one end of the high voltage secondary winding through the high voltage rectification circuit 46-1 (or 46-2) and an output of an external oscillator is applied to a terminal P42 and a reference power supply of the low voltage rectification circuit 47 is connected to a terminal P43.

The load current of the charger 49 or 50 flows in a loop of the high voltage rectification circuit 46-2 (or 46-1)→the charger 49 (or 50)→the frame ground→the current sampling resistor R47 of the DC-DC inverter 40-2 (or 40-1)→the resistor R46 and the capacitor C42→the rectifying diode D42→the secondary winding of the converter transformer T42→the high voltage rectification circuit 46-2 (or 46-1). The sample detected by the resistor R47 is compared with the reference voltage applied to the terminal P43 by the operational amplifier Q41 to control the drive voltage of the primary winding of the converter transformer T41 so that the load current is kept constant.

Since the converter transformer T42 of the DC-DC inverter 40-1 or 40-2 has a relatively small output voltage and a small output power, it is much more inexpensive than the converter transformer T41. By using a multiple of stages of the rectification circuit of the DC-DC converters 40-1 and 40-2, the cost of the converter transformer T42 can be reduced. While the outputs of the DC-DC converters 40-1 and 40-2 in FIG. 22 are series-regulated, they may be switching-regulated. While the illustrated embodiment controls such that the load currents of the chargers 49 and 50 are kept constant, the load voltage may be controlled to a constant level by dividing the load voltage and comparing it with a reference voltage.

As described hereinabove, according to the present invention, since the high voltage transformer and the low voltage transformer are combined, a substantial cost reduction is attained. The output power of the converter transformer T42 of the DC-DC inverter 40-1 or 40-2 is smaller than 1 watt and the output voltage thereof is lower than 1 KV. If a voltage doubler is used, the output voltage may be lower than 500 volts. Thus, the cost of the converter transformer T42 is only 10–20% of the cost of the converter transformer 5. Accordingly, the same stabilization as attained by a prior art circuit which uses a high voltage transformer for each charger is attained with a low cost.

The present invention also improve power efficiency. For example, when a variable range of output voltage of 5 KV–6 KV with an output current of 1 mA is required, the output should be 6.67 KV ±10% if a variation of the transformer is ±10%. If the variation is maximum in a positive direction at the efficiency of 50%, a power of $\{(6.67 \text{ KV} \times 1.1) - 5.0 \text{ KV}\} \times 1 \text{ mA} \times (1/0.5) = 4.67$ watts is required. On the other hand, in the present invention which is variable between 0 and 1 KV, the required output of the DC-DC inverter under the same condition is $(1 \text{ KV}/0.9) = 1.11$ KV. If the variation is maximum in the positive direction, the required output is $1.11 \times 1.1 = 1.22$ KV. Accordingly, the power consumed by the DC-DC inverter is $1.22 \text{ KV} \times 1 \text{ mA} \times (1/0.5) = 2.44$ watts. Thus, the power loss is reduced to approximately one-half of that of the prior art unit.

Figure 23:
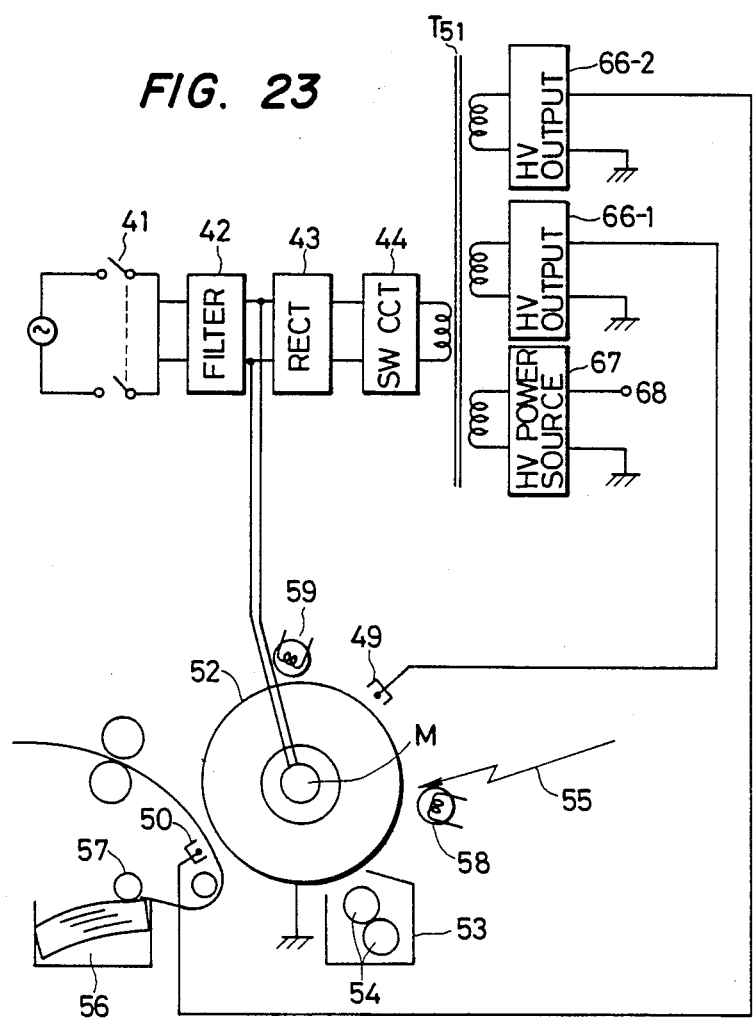
FIG. 23 shows a block diagram of one embodiment of a copying machine which incorporates the present power supply unit.

FIG. 23 shows another embodiment of the present invention. Similar functional elements to those shown in FIG. 21 are designated by like numerals.

As explained in FIG. 21, when the power switch 41 is closed, the power is supplied to the main motor M and the rectification circuit 43 through the filter circuit 42. Thus, the photosensitive drum 52 starts to rotate and the switching circuit 44 switches the output of the rectification circuit 43. As the switching circuit 44 operates, the high voltages induced by the converter transformer T51 are taken out as D.C. voltages of, for example, 5–8 KV from the high voltage output circuits 66-1 and 66-2 and they are supplied to the primary charger 49 and the transfer charger 50, respectively. A voltage (for example 12–24 V) developed by a low voltage power supply circuit 67 similar to the rectifying power supply circuit 47 of FIG. 21 is supplied to a sequence control circuit, clutches and lamps through an output terminal 68. Accordingly, upon the power-on, the sequence controller, not shown, is operated and the predischarging lamp 59 and the blank exposure lamp 58 are lit. Then, when the drum 52 has been cleaned after several revolutions and a fixing unit is ready to fix, a copying operation is enabled and the drum surface is uniformly charged by the primary charger 49. Then, an optical system, not shown, and the paper feed roller 57 are operated to project the scanning light 55 to an original and paper is fed from the paper feed cassette 56 through the transfer charger 50 and it is developed by the developing unit 53 and the developing roller 54 to make a copy.

Figure 24:
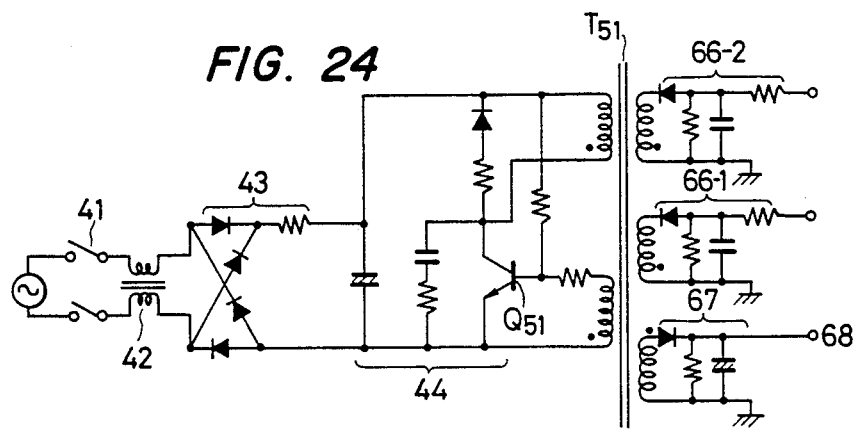
FIG. 24 shows a circuit diagram of blocks 41–47 shown FIG. 23.

FIG. 24 shows a specific circuit of the blocks shown in FIG. 23. The output of the rectification circuit 43 comprising a diode bridge circuit is switched by the switching circuit 44 comprising a self-excited inverter. A transistor Q51 of the switching circuit 44 is turned on when the power switch is closed. As the transistor Q51 is turned on, a positive voltage is induced in a primary winding of a converter transformer T51 and it is applied to a base of the transistor Q51 so that a collector current of the transistor Q51 linearly increases. When the magnetic flux of the converter transformer T51 saturates, a polarity of the voltage induced in the primary winding is reversed. As a result, the transistor Q51 is turned off and the energy stored during the on period of the transistor Q51 is discharged to a secondary circuit. After the energy has been discharged the polarity of the induced voltage of the winding is again reversed and the transistor Q51 is turned on. In this manner, the transistor Q51 continues th self-excited oscillation so that the D.C. output voltages are continuously supplied from the high voltage output circuits 66-1 and 66-2 and the low voltage power supply circuit 67.

Figure 25:
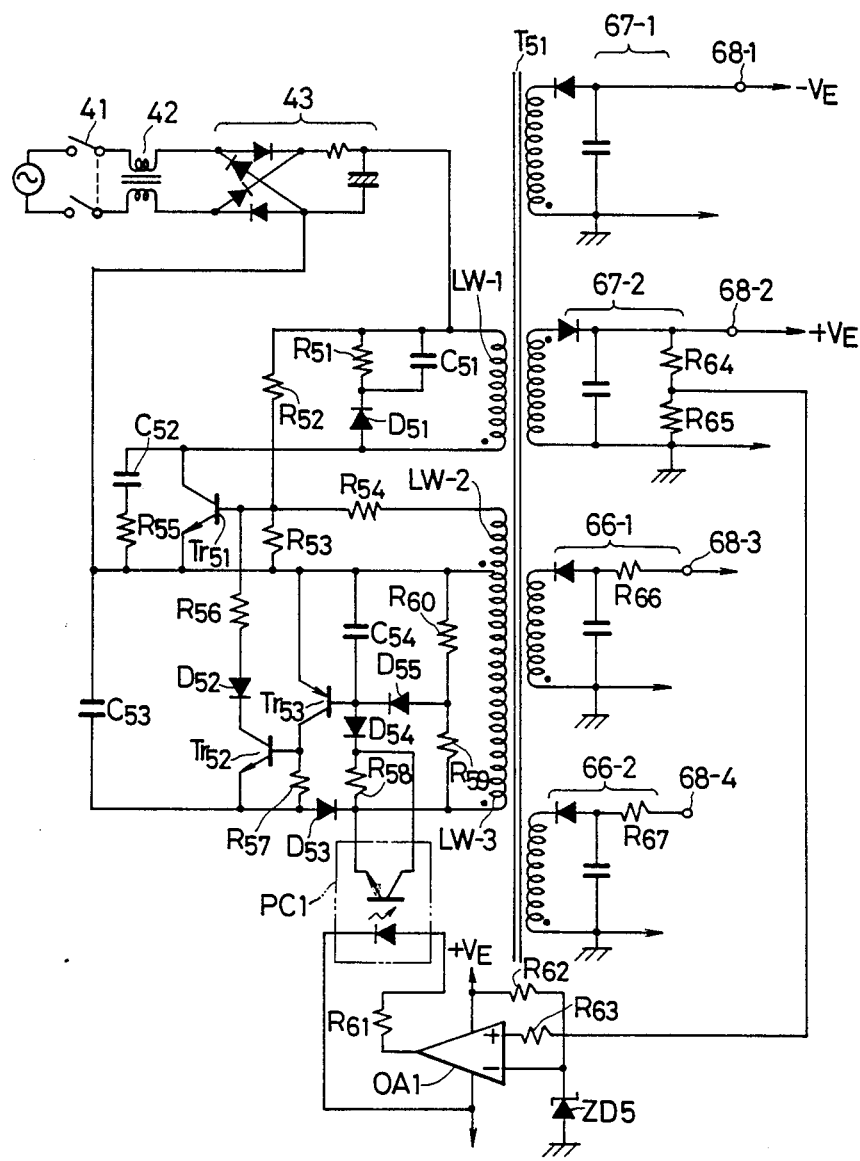
FIG. 25 shows a circuit diagram of one embodiment of the power supply unit which includes a feedback circuit.

FIG. 25 shows an embodiment of a circuit which stabilizes the power supply circuit shown in FIG. 24 without adding an auxiliary power supply and without increasing power loss. In FIG. 25, an output of a low voltage power supply circuit 67-2 is divided by resistors R64 and R65 and the divided voltage is compared with a reference voltage of a zener diode ZD5 by an operational amplifier OA 1. When a light emitting element of a photo-coupler PC1 is activated by the output of the operational amplifier OA 1, an impedance across a resistor R57 drops to increase a discharge current of a capacitor C54 connected to an anode of a diode D54. When the voltage at the junction of the capacitor C54 and the diode D54 reaches a predetermined negative potential, a transistor Tr53 is turned on and a transistor Tr52 is also turned on. Thus, a base of a transistor Tr51 is negatively biased and the transistor Tr51 is turned off. As a result, a positive pulse appears at a collector of the transistor Tr51 and the energy stored during the on period of the transistor Tr51 is discharged to the secondary winding of the converter transformer T51. When the transistor T52 is conducted by the conduction of the transistor Tr53, the transistor Tr51 is turned off and a counter e.m.f. is developed in the winding. Since the polarity of the counter e.m.f. applied to the resistor R54 is negative, the transistor Tr51 is rendered nonconductive until the energy stored in the collector winding is exhausted. During this period, a positive voltage induced in a primary winding LW-3 is supplied to a timing capacitor C54 through a resistor R59 and a diode D55 so that the transistors Tr53 and Tr52 are turned off. The larger the output of the operational amplifier OA1 is, the faster capacitor C54 is charged to the negative potential. Accordingly, the conduction period of the transistor Tr51 decreases in accordance with a discharge time constant. As a result, the D.C. output voltage derived by rectifying and smoothening the voltage induced in the secondary winding of the converter transformer T51 is kept constant. In this manner, the output voltage is stabilized by the control of the duty cycle. Since the converter transformer T51 has sufficiently low leakage reactance and a winding resistance, the voltage variations of a plurality of secondary windings can be maintained within an allowable range by detecting an output voltage of one of the plurality of secondary windings and feeding it back. Accordingly, the output voltages of all of the windings can be stabilized notwithstanding the load variation and the input voltage variation. Since constant currents must be supplied to the chargers, the high voltages are supplied to terminals 68-3 and 68-4 through high resistance resistors R66 and R67, respectively.

Figure 26:
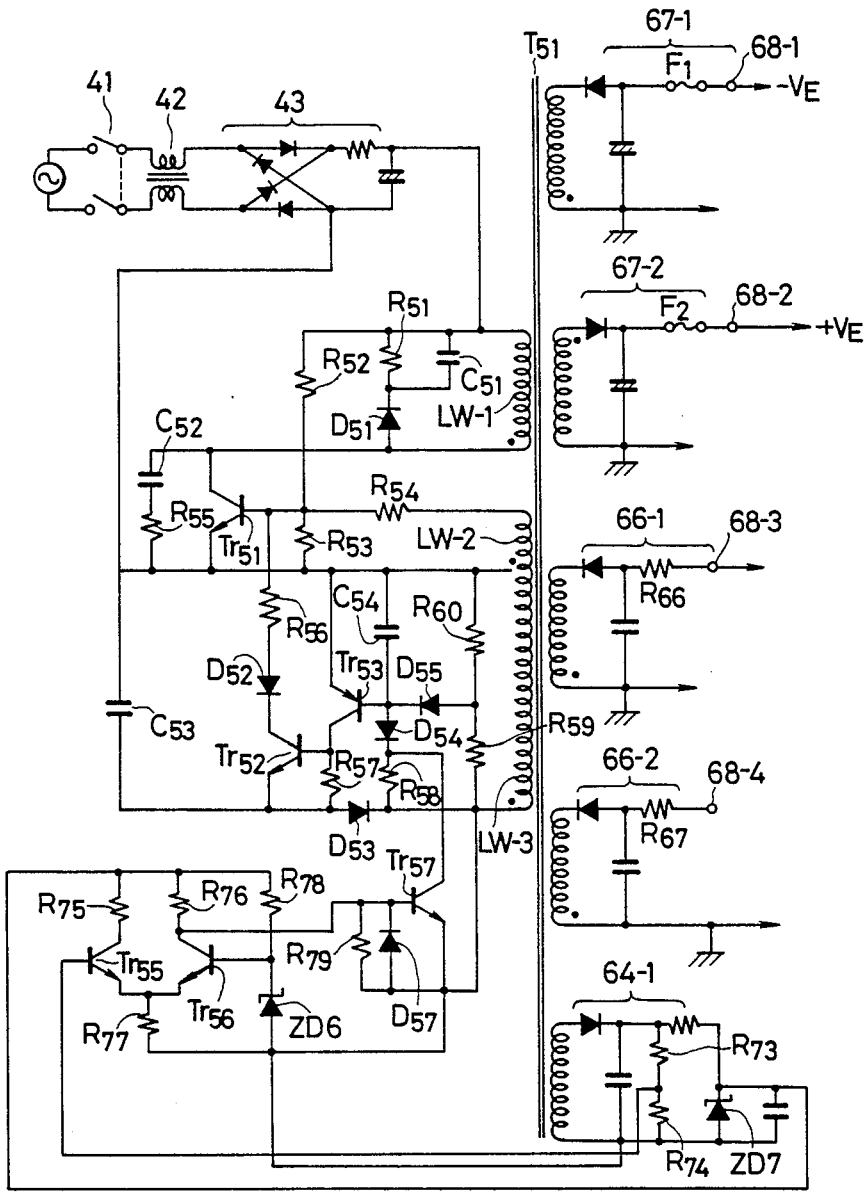
FIG. 26 shows a circuit of another embodiment of the present power supply unit which has a feedback winding.

FIG. 26 shows another embodiment of the present invention. It differs from the embodiment shown in FIG. 25 in that it has a separate detection circuit for constant voltage control. A separate detection winding is provided to eliminate the influence by the load and the detection winding is isolated from the ground line and the detected signal is fed back to the primary winding without using the photo-coupler. A voltage divided by resistors R73 and R74 and a reference voltage of a zener diode ZD7 are compared by an operational amplifier comprising transistors Tr55 and Tr56 to control the conduction of a transistor Tr57 so that the signal is fed back to the primary winding circuit to stabilize the output voltage.

Figure 27:
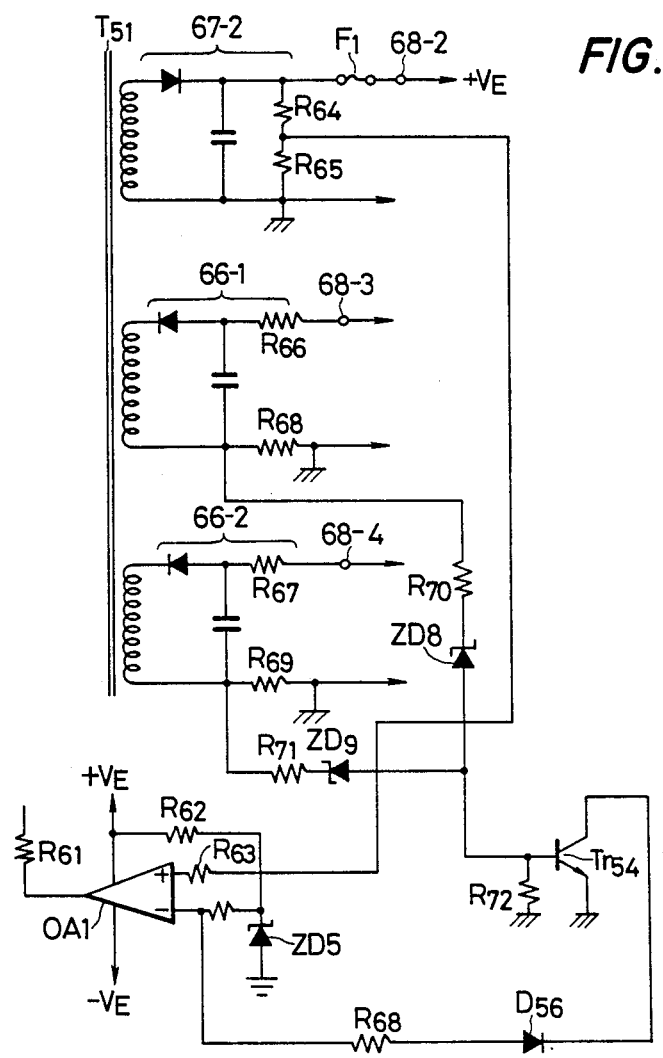
FIG. 27 shows a short circuit protection circuit suitable for present power supply unit.

FIG. 27 shows an embodiment in which a short circuit protection circuit is added to the circuit of FIG. 25. In FIG. 27, a fuse or a circuit breaker F1 is inserted in the low voltage power supply circuit 67-2 and resistors R68 and R69 are inserted in the high voltage output circuits 66-1 and 66-2. In case of short circuit or overload, a voltage is applied to a base of a transistor Tr54 through zener diodes ZD8 and ZD9 to turn on the transistor Tr54 so that the (−) input terminal of the operational amplifier OA1 approaches ground level to increase the output voltage of the operational amplifier OA1 to a sufficiently high level and the output impedance of the photo-coupler PC1 (FIG. 25) is sufficiently reduced to decrease the output voltage. The resistors R66 and R67 have resistances approximately equal to 10–50% of equivalent load resistances of the chargers and they are inserted to stabilize the charging characteristics.

Figure 28:
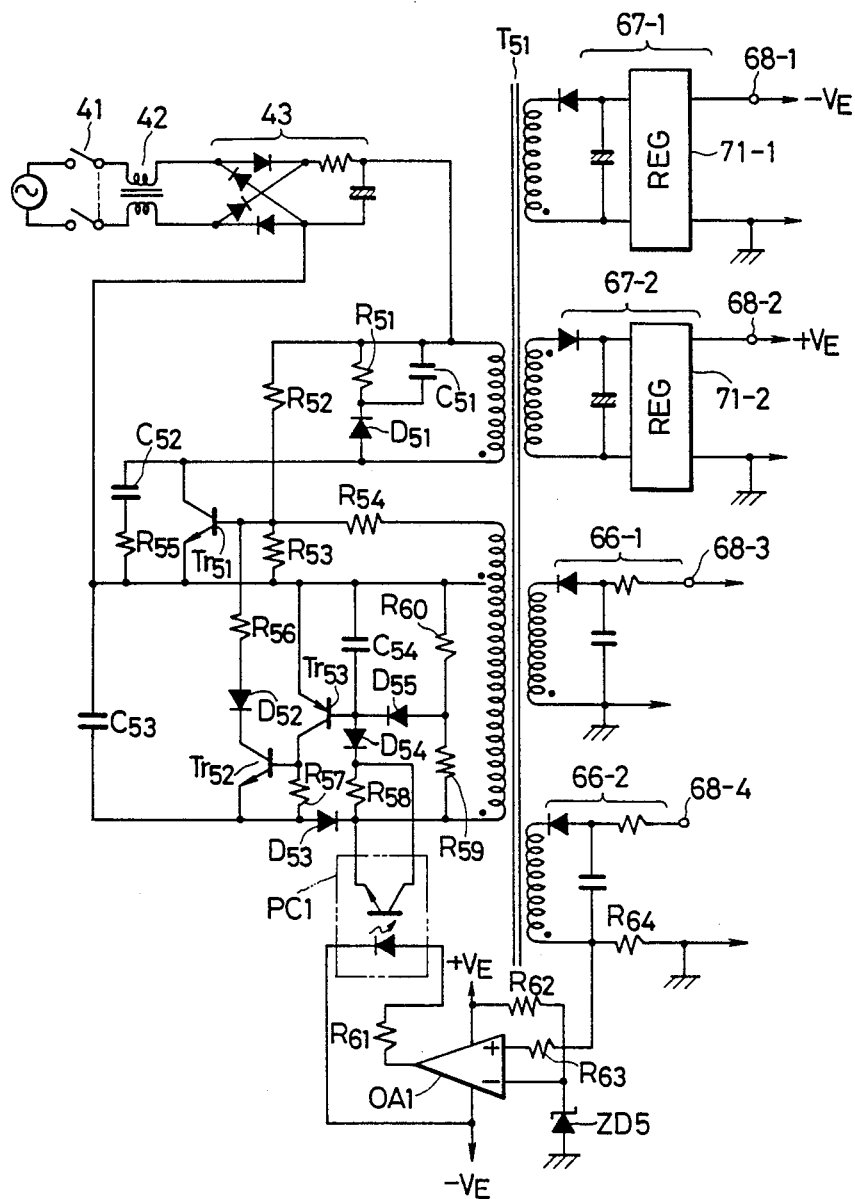
FIG. 28 snows a circuit diagram of a power supply unit which has a constant current control circuit.

FIG. 28 shows an embodiment which detects a voltage across a resistor R64 of the high voltage output circuit 66-2 and feeds it back to the primary winding circuit. Since the load current of the high voltage output circuit 66-2 is detected as the voltage across the resistor R64, the voltage at the terminal 68-4 is controlled such that the constant current is supplied to the load. Since the output voltages of the low voltage power supply circuits 67-1 and 67-2 are varied by the constant current control, regulators 71-1 and 71-2 are inserted. If the current variations of the chargers are small, the regulators 71-1 and 71-2 may be omitted.

Figure 29:
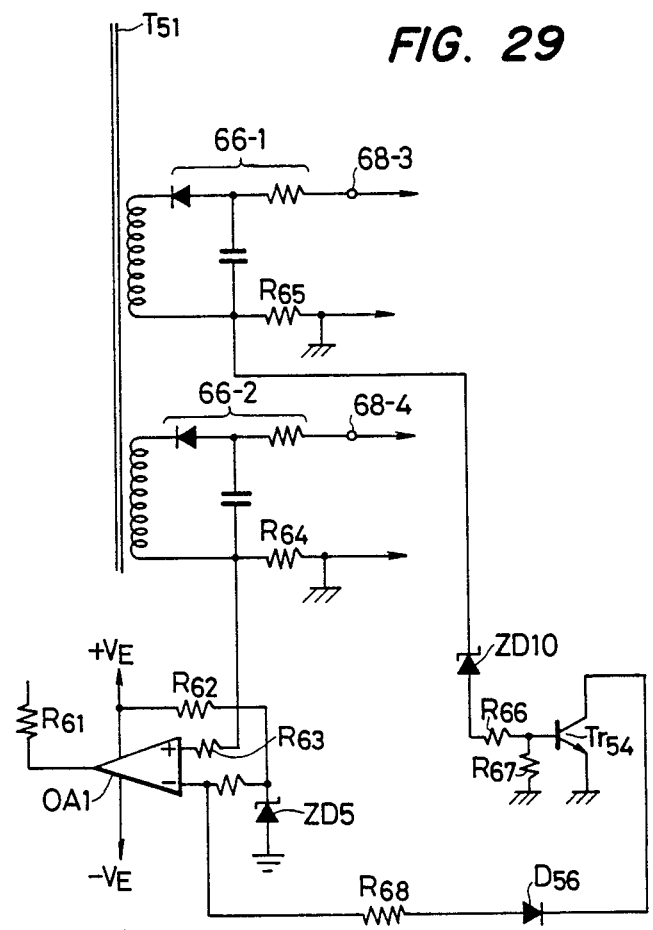
FIG. 29 shows a short circuit protection circuit suitable to the present power supply unit.

FIG. 29 shows an embodiment in which a short circuit protection circuit is added to the circuit of FIG. 28. A resistor R65 for detecting a short circuit current is inserted in the high voltage output circuit 66-1 shown in FIG. 28 and a voltage across the resistor R65 is applied to a transistor Tr54 to conduct it. As a result, the potential at the (−) input terminal of the operational amplifier OA1 approaches to ground level increase the output of the operational amplifier OA1 and the output impedance of the photo-coupler PC1 (FIG. 28) is sufficiently reduced to decrease the output voltage. A series circuit of a zener diode ZD10 and a resistor R66 is inserted between the base of the transistor Tr54 and the detecting terminal of the resistor R65 to detect an excess voltage across the resistor R65 in the short circuit condition and protect the base of the transistor Tr54.

As described above, according to the present embodiment, the D.C. voltage derived by rectifying a commercial power supply is switched and supplied to the transformer having the low voltage winding for the sequence controller and the high voltage winding for the charger and a portion of the voltage in the secondary winding of the transformer is fed back to the primary winding. Accordingly, the high voltage power supply and the low voltage power supply required for the copying machine can be provided in a stable manner.

Figure 30:
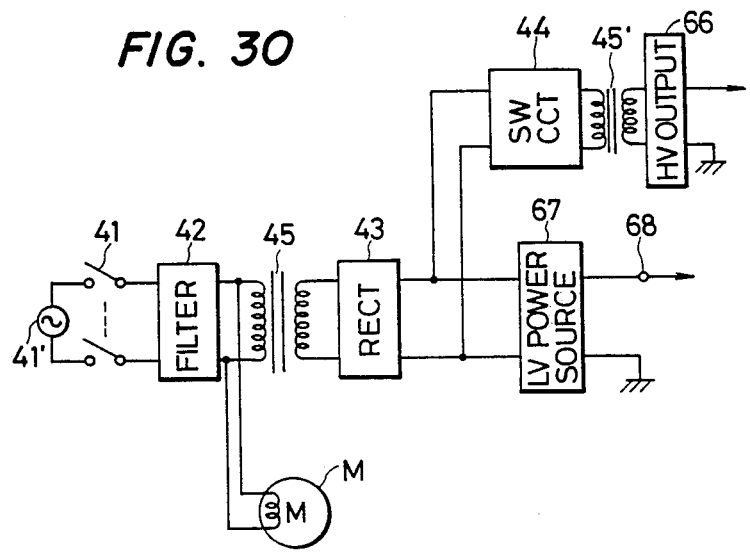
FIG. 30 shows a block diagram of another embodiment of the present power supply unit.

FIG. 30 shows another embodiment of the present invention. Similar elements to those shown in FIG. 23 are designated by like numerals and they are not explained here.

In FIG. 30, a transformer 45 of a line frequency is inserted between the filter circuit 42 and the rectification circuit 43 so that the voltage is stepped up and then supplied to the high voltage switching circuit 44 and the low voltage power supply circuit 67 through the rectification circuit 43.

Figure 31:
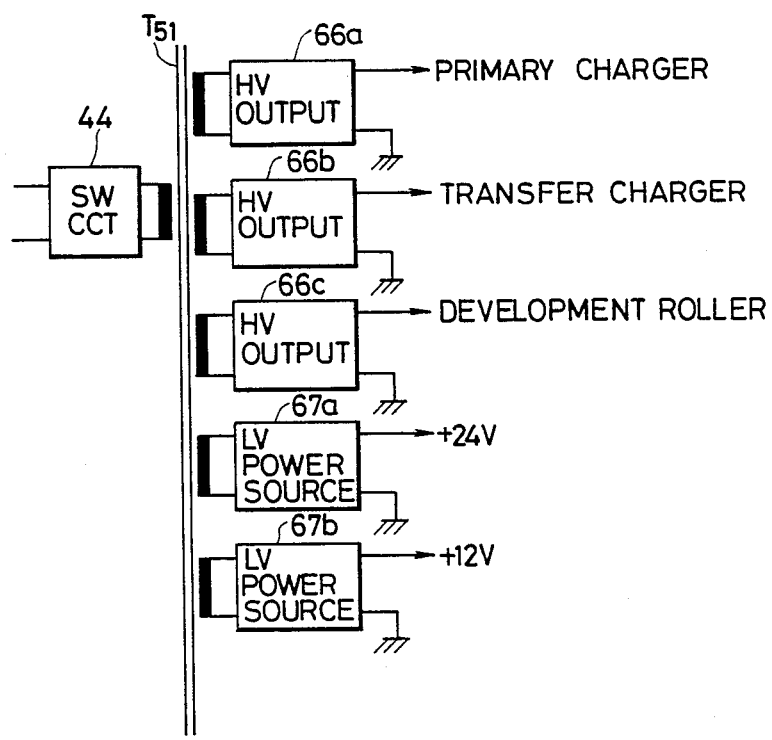
FIG. 31 shows a block diagram of a power supply unit which supplies power to a high voltage load and a low voltage load from a plurality of secondary windings.

FIG. 31 shows another embodiment of the present invention. In FIG. 31, the output winding of the converter transformer T51 is further divided and high voltages are supplied to the primary charger 49 and the transfer charger 50 through high voltage output circuits 66a and 66b, and a bias voltage to the developing roll 54 is supplied through a separate high voltage output circuit 66c. The low voltage supply circuit is also divided into two low voltage power supply circuits 67a and 67b which supply 24 volts for the clutches, solenoids and lamps and 12 volts for the sequence controller.

As described hereinabove, according to the present invention, the motor for driving the photosensitive drum and the chargers are turned on and off in accordance with the power-on and power-off. Accordingly, the photosensitive drum is continuously rotated during the power-on period and the chargers are always kept energized. Thus, the sequence is simplified and a control circuit for the rotation of the photosensitive drum and the energization of the chargers is not necessary.

Further, since the power supply for the sequence controller and the high voltage power supply for the chargers are wound on the same transformer, the power supply unit is compact, light and inexpensive, and the efficiency is significantly improved over the prior art unit in which the voltage is once converted to a low voltage and then stepped up by a DC—DC converter, and heat dissipation is reduced.

The present invention is not limited to the illustrated embodiments but many modifications thereof can be made.

What is claimed is;

1. A high voltage power supply unit comprising:
   a transformer having a single secondary winding which has a plurality of output circuits for providing high voltage outputs to drive a plurality of loads;
   drive means including a primary winding of said transformer for driving said transformer;
   a pulse generator for actuating said drive means;
   deduction means for detecting the amount of current flowing into a predetermined load connected to a secondary winding output of said transformer, through an element electrically insulated from said predetermined load; and
   control means for controlling an output current of a predetermined one of said plurality of output circuits to a constant level in accordance with a detection output of said detection means;
   wherein said drive means includes a resonant circuit resonating with an output of said pulse generator for driving said transformer to provide said high voltage, and wherein said drive means has a first function for storing energy at the primary winding of said transformer to provide said high voltage output at the output circuits of said transformer and a second function for emitting the stored energy.

2. A power supply unit for an electrostatic printing apparatus according to claim 1 wherein said control means control said drive means to keep the output of said selected output circuit to the constant level.

3. A power supply unit for an electrostatic printing apparatus according to claim 1 wherein said pulse generator includes oscillation means for driving said transformer at a predetermined frequency.

4. A power supply unit for an electrostatic printing apparatus according to claim 2 wherein said control means controls said drive means by varying on and off timing of said pulse waveform.

5. A power supply unit for an electrostatic printing apparatus according to claim 2 wherein said control means includes voltage control means for controlling a voltage applied to the primary winding of said transformer.

6. A high voltage power supply unit according to claim 1, wherein said first function of said drive means is performed by disabling said resonant circuit and said second function of said drive means is performed by enabling said resonant circuit.

7. A high voltage power supply unit according to claim 1, further comprising image forming means including a recording medium for forming an image thereon and charging means for charging said recording medium, wherein said transformer provides a high voltage output for said charging means.

8. A high voltage power supply unit according to claim 1, wherein said insulated element includes a transformer.

9. A high voltage power supply unit according to claim 1, wherein said insulated element includes a photo-coupler.

10. A high voltage power supply unit according to claim 1, wherein said detection means detects the amount of current flowing in a line which is directionly connected to said load and which is opposite to ground.

11. A power supply unit comprising:
    a transformer having a plurality of secondary winding output circuits for providing high and low voltage outputs to drive a plurality of loads;
    drive means including a primary winding of said transformer for driving said transformer;
    a pulse generator for actuating said drive means;
    detection means for detecting the amount of current flowing into a load connected to a secondary winding output of said transformer;
    adding means for adding a direct current source to at least one of said plurality of secondary winding output circuits; and
    control means for controlling said adding means to stabilize an output of a predetermined one of said plurality of secondary winding output circuits to a constant level in accordance with a detection output of said detection means;
    wherein said drive means includes a resonant circuit resonating with an output of said pulse generator for driving said transformer to provide said high and low voltages, and wherein said drive means has a first function for storing energy at the primary winding of said transformer to provide said high and low voltage outputs at the secondary winding output circuits of said transformer and a second function for emitting the stored energy.

12. A power supply unit according to claim 11, wherein said first function of said drive means is performed by disabling said resonant circuit and said second function of said drive means is performed by enabling said resonant circuit.

13. A power supply unit according to claim 11, wherein the secondary winding output circuits each include a current circuit and wherein at least one of the current circuits is connected to a low voltage load and each other current circuit is connected to a high voltage load.

14. A power supply unit according to claim 11, wherein said detection means detects the output of a secondary winding output circuit connected to a low voltage load.

15. A power supply unit according to claim 11, wherein said detection means detects the output of a secondary winding output circuit connected to a high voltage load.

16. A power supply unit according to claim 11, further comprising image forming means including a recording medium for forming an image thereon and charging means for charging said recording medium, wherein said transformer provides a high voltage output for said charging means.

* * * * *

UNITED STATES PATENT AND TRADEMARK OFFICE
CERTIFICATE OF CORRECTION

PATENT NO. : 4,868,729

DATED : September 19, 1989

INVENTOR(S) : Koji Suzuki

It is certified that error appears in the above-identified patent and that said Letters Patent is hereby corrected as shown below:

ON THE TITLE PAGE
[30] Foreign Application Priority Data:

"Jul. 7, 1982 [JP] Japan 57-129617" should read --Jul. 27, 1982 [JP] Japan 57-129617--.

ON THE TITLE PAGE
[56] References Cited:

"56196521 6/1983 Japan" should read --56-196521 6/1983 Japan--.

COLUMN 1:

Line 18, "o" should read --or--.

Line 27, "also" should be deleted.

Line 60, "ones of a plurality of" should be deleted.

COLUMN 2:

Line 60, "drive s a" should read --drive signal as a--.

UNITED STATES PATENT AND TRADEMARK OFFICE
CERTIFICATE OF CORRECTION

PATENT NO. : 4,868,729

DATED : September 19, 1989

INVENTOR(S) : Koji Suzuki

It is certified that error appears in the above-identified patent and that said Letters Patent is hereby corrected as shown below:

COLUMN 4:

Line 12, "produces" should read --produce--.

Line 13, "thermister" should read --thermistor--.

Line 60, "-the" should read --the--.

COLUMN 5:

Line 37, "VCC" should read --$V_{cc}$--.

Line 53, "A1ternatively" should read --Alternatively--.

COLUMN 6:

Line 27, "$\alpha$" should read --$\alpha''$--.

Line 28, "$\alpha$" should read --$\alpha''$--.

Line 31, "$\alpha$" should read --$\alpha''$--.

UNITED STATES PATENT AND TRADEMARK OFFICE
CERTIFICATE OF CORRECTION

PATENT NO. : 4,868,729

DATED : September 19, 1989

INVENTOR(S) : Koji Suzuki

It is certified that error appears in the above-identified patent and that said Letters Patent is hereby corrected as shown below:

COLUMN 7:

Line 6, "of" should be deleted.

COLUMN 13:

Line 1, "L23is" should read --L23 is--.

COLUMN 14:

Line 16, "the base, and" should be deleted.

COLUMN 16:

Line 68, "current" should read --current,--.

COLUMN 18:

Line 64, "$(V_{upper} - V_{low}) + \beta,$" should read --$(V_{upper} - V_{low}) + \alpha$--.

UNITED STATES PATENT AND TRADEMARK OFFICE
CERTIFICATE OF CORRECTION

Page 4 of 4

PATENT NO. : 4,868,729

DATED : September 19, 1989

INVENTOR(S) : Koji Suzuki

It is certified that error appears in the above-identified patent and that said Letters Patent is hereby corrected as shown below:

COLUMN 20:
    Line 17, "improve" should read --improves--.

COLUMN 22:
    Line 54, "to ground level" should read --ground level to--.

COLUMN 24:
    Line 7, "control" should read --controls--.
    Line 42, "directionly" should read --directly--.

Signed and Sealed this

Seventeenth Day of September, 1991

Attest:

HARRY F. MANBECK, JR.

*Attesting Officer*      *Commissioner of Patents and Trademarks*